United States Patent
Becker

(10) Patent No.: US 12,180,916 B2
(45) Date of Patent: Dec. 31, 2024

(54) INTERCHANGEABLE INTAKE MANIFOLD ASSEMBLIES

(71) Applicant: Velossa Tech Engineering Inc., Davie, FL (US)

(72) Inventor: Dan Joseph Becker, Davie, FL (US)

(73) Assignee: Velossa Tech Engineering Inc., Davie, FL (US)

( * ) Notice: Subject to any disclaimer, the term of this patent is extended or adjusted under 35 U.S.C. 154(b) by 17 days.

(21) Appl. No.: 16/785,609

(22) Filed: Feb. 9, 2020

(65) Prior Publication Data

US 2021/0246855 A1    Aug. 12, 2021

(51) Int. Cl.
*F02M 35/10* (2006.01)
*B60K 13/02* (2006.01)
(Continued)

(52) U.S. Cl.
CPC ....... *F02M 35/10262* (2013.01); *B60K 13/02* (2013.01); *B60Q 1/442* (2013.01);
(Continued)

(58) Field of Classification Search
CPC .................. B60K 13/02; F02M 35/161; F02M 35/10013; F02M 35/10124; F02M 35/10131; F02M 35/088
(Continued)

(56) References Cited

U.S. PATENT DOCUMENTS 3,485,252 A    12/1969  Brown
3,987,862 A *  10/1976  Lidstone ................ B60K 13/02
                                                        55/327

(Continued)

FOREIGN PATENT DOCUMENTS

DE    102005040850 A1 *  3/2007  ............ F16L 33/035
EP       0867608 A2      9/1998
(Continued)

OTHER PUBLICATIONS

English machine translation of description from ESPACENENT for FR-2933045-A1 (Year: 2021).*
(Continued)

*Primary Examiner* — Kurt Philip Liethen
*Assistant Examiner* — John D Bailey
(74) *Attorney, Agent, or Firm* — BEKIARES ELIEZER LLP

(57) ABSTRACT

An apparatus may comprise a base member being defined by a rectangular aperture configured to receive and engage an automobile intake box, the base member being further defined by a perimeter surrounding the rectangular aperture and having at least one fastener or aperture configured to receive a fastener dimensioned to avoid disturbing the automobile intake box; a gooseneck member fixedly attached to the base member, the gooseneck member having a first end opening and a second end opening, the gooseneck member having an interior cavity configured to direct air into the automobile intake box from the second end opening to the first end opening through the interior cavity; and an interchangeable bell housing removably secured to the second end opening of the gooseneck member, the interchangeable bell housing having a frustoconical shaped cross section on at least one plane.

20 Claims, 20 Drawing Sheets

(51) Int. Cl.
 *B60Q 1/44* (2006.01)
 *B60R 19/52* (2006.01)
 *F02M 35/16* (2006.01)

(52) U.S. Cl.
 CPC ....... *B60R 19/52* (2013.01); *F02M 35/10124* (2013.01); *F02M 35/10144* (2013.01); *F02M 35/10321* (2013.01); *F02M 35/10327* (2013.01); *F02M 35/10347* (2013.01); *F02M 35/161* (2013.01)

(58) Field of Classification Search
 USPC ....................................................... 180/68.3
 See application file for complete search history.

(56) References Cited

U.S. PATENT DOCUMENTS

| | | | | |
|---|---|---|---|---|
| 4,157,902 | A * | 6/1979 | Tokar | F02M 35/10262 55/327 |
| 4,366,878 | A * | 1/1983 | Warf | B60K 13/02 55/385.3 |
| 4,610,326 | A | 9/1986 | Kirchweger et al. | |
| 4,782,912 | A | 11/1988 | Wandless | |
| 5,069,298 | A | 12/1991 | Titus | |
| 5,147,430 | A | 9/1992 | Kidd | |
| 5,195,484 | A * | 3/1993 | Knapp | F02M 35/10013 180/68.3 |
| 5,251,712 | A | 10/1993 | Hayashi et al. | |
| 5,609,298 | A | 3/1997 | Hyslop | |
| 5,722,358 | A | 3/1998 | Fuesser et al. | |
| 6,698,539 | B2 | 3/2004 | Decuir | |
| 7,114,476 | B1 * | 10/2006 | Wimmer | F02M 9/00 123/184.21 |
| D637,205 | S * | 5/2011 | Luxon | D12/400 |
| D642,199 | S * | 7/2011 | Luxon | D12/400 |
| 8,181,729 | B2 * | 5/2012 | Hiramatsu | B62M 7/02 180/68.1 |
| 8,277,548 | B2 * | 10/2012 | Kleinfeld | F01N 1/085 96/380 |
| 8,960,347 | B2 | 2/2015 | Bennett | |
| 9,234,484 | B2 * | 1/2016 | Lewington | F02M 35/10013 |
| 9,574,790 | B2 | 2/2017 | Hasegawa et al. | |
| 10,167,825 | B1 * | 1/2019 | Dane | F02M 35/10262 |
| 10,393,076 | B1 * | 8/2019 | Freeman | B60K 13/02 |
| 10,428,773 | B1 * | 10/2019 | Bennett | B60K 13/02 |
| D905,117 | S * | 12/2020 | Bennett | D12/400 |
| 11,135,538 | B2 * | 10/2021 | Niakan | B01D 46/2411 |
| 2001/0013675 | A1 * | 8/2001 | Nakagawa | B29C 33/005 264/513 |
| 2004/0094111 | A1 | 5/2004 | Concialdi | |
| 2004/0134461 | A1 * | 7/2004 | Bishop | F02M 35/10019 123/198 E |
| 2004/0139708 | A1 * | 7/2004 | Giacinto | F02M 35/10196 55/385.3 |
| 2005/0072393 | A1 * | 4/2005 | Now | F01N 13/10 123/184.53 |
| 2005/0215191 | A1 * | 9/2005 | Kino | B60K 13/02 454/143 |
| 2006/0185639 | A1 * | 8/2006 | Rosenbaum | F02M 35/10144 138/120 |
| 2006/0278192 | A1 * | 12/2006 | Now | F02M 35/10019 123/184.53 |
| 2010/0032220 | A1 * | 2/2010 | Ohira | F02M 35/161 123/556 |
| 2010/0083928 | A1 * | 4/2010 | Saito | F02B 27/005 123/184.56 |
| 2010/0147243 | A1 * | 6/2010 | Stec | F02M 35/10301 123/184.21 |
| 2012/0190290 | A1 * | 7/2012 | Niakan | F02M 35/10131 454/254 |
| 2015/0197149 | A1 * | 7/2015 | Hedlund | B60K 13/02 180/309 |
| 2017/0072785 | A1 * | 3/2017 | Cho | B60K 13/02 |
| 2017/0260939 | A1 * | 9/2017 | Williams | F02M 35/161 |
| 2018/0258890 | A1 * | 9/2018 | Takamura | F02M 35/0245 |
| 2018/0363603 | A1 * | 12/2018 | Itagaki | B60K 13/02 |
| 2019/0388819 | A1 * | 12/2019 | Niakan | B01D 46/0005 |
| 2019/0388820 | A1 * | 12/2019 | Niakan | F02M 35/0201 |
| 2020/0001219 | A1 * | 1/2020 | Niakan | B01D 46/0002 |
| 2020/0080523 | A1 * | 3/2020 | Driant | B01D 45/08 |
| 2020/0132027 | A1 * | 4/2020 | Bennett | B60K 13/02 |
| 2020/0263641 | A1 * | 8/2020 | Blanks, I | F02M 35/10354 |
| 2021/0017940 | A1 * | 1/2021 | McCann | F02M 35/10091 |
| 2021/0033049 | A1 * | 2/2021 | Ohno | F02M 35/10262 |
| 2021/0148312 | A1 * | 5/2021 | Kober | F02M 35/10373 |
| 2022/0324319 | A1 * | 10/2022 | Becker | F02M 35/10321 |
| 2023/0035209 | A1 * | 2/2023 | Zope | F02M 35/0216 |

FOREIGN PATENT DOCUMENTS

| | | | | |
|---|---|---|---|---|
| EP | 2103511 | B1 | 7/2010 | |
| FR | 2933045 | A1 * | 1/2010 | ....... F02M 35/10013 |
| JP | 6072074 | B2 | 2/2017 | |

OTHER PUBLICATIONS

How to Install Big Mouth Ram Air Intake Ford Focus RS. https://www.youtube.com/watch?v=bwPBelbTamY. Blake's Garage. Accessed Jan. 3, 2023, published on Ma 30, 2017. (Year: 2017).*
Ford Focus Big Mouth Intake Snorkel Install !. https://www.youtube.com/watch?v=oV3E-le4Eu4. Cameron Alford. Accessed Jan. 3, 2023, published on Nov. 12, 2019. (Year: 2019).*
International Search Report and Written Opinion dated Nov. 17, 2021 cited in PCT Application No. PCT/US21/26465, 22 pgs.
Video: Velossa Tech Gen 4 Released/Sneak Peak Veloster N Big Mouth With Exchangeable Flares, https://www.youtube.com/watch?v=DBsfgLQCa6Q, Feb. 12, 2021, 3 pgs.
Generation 4 Interchangeable Big Mouth | Flare/Inlet Only, https://web.archive.org/web/20201126061651/https://www.velossatechdesign.com/products/generation-4-interchangeable-big-mouth-flare-inlet-only, Nov. 26, 2020, 3 pgs.
Video: Focus ST Velossa Tech Big Mouth Install, https://www.youtube.com/watch?v=5MfC6K9doZA, Feb. 19, 2017, 3 pgs.
Chinese Second Office Action dated Sep. 21, 2022 cited in Application No. 202220245512.4, 7 pgs.
Related U.S. Continuation U.S. Appl. No. 17/677,573, filed Feb. 22, 2022, Inventor: Dan Joseph Becker (copy available in IFW).
Related Chinese Divisional Application No. 2022202455124 filed Jan. 29, 2022, Inventor: Dan Joseph Becker, 73 pgs.
Chinese First Office Action dated Jun. 2, 2022 cited in Application No. 202220245512.4, 6 pgs.
International Preliminary Report on Patentability dated Aug. 18, 2022 cited in PCT Application No. PCT/US21/26465, 18 pgs.
Copending PCT Application No. PCT/US21/26465 filed Apr. 8, 2021, Inventor: Dan Joseph Becker (copy available in IFW).
Copending Design U.S. Appl. No. 29/817,918, filed Dec. 6, 2021, Inventor: Dan Joseph Becker (copy available in IFW).
Copending Design U.S. Appl. No. 29/817,920, filed Dec. 6, 2021, Inventor: Dan Joseph Becker (copy available in IFW).
Copending Design U.S. Appl. No. 29/817,923, filed Dec. 6, 2021, Inventor: Dan Joseph Becker (copy available in IFW).
Copending Design U.S. Appl. No. 29/817,926, filed Dec. 6, 2021, Inventor: Dan Joseph Becker (copy available in IFW).
Copending Design U.S. Appl. No. 29/817,931, filed Dec. 6, 2021, Inventor: Dan Joseph Becker (copy available in IFW).

* cited by examiner

INTERCHANGEABLE INTAKE MANIFOLD ASSEMBLIES

FIELD OF INVENTION

The present invention relates to devices, systems, and methods for an interchangeable intake manifold assembly and portions thereof.

BACKGROUND OF THE INVENTION

Conventionally, intake manifold assembly upgrades to an automobile require cutting and/or altering the interior of an engine space, including sometimes permanent removal of engine components. For example, new intake manifold assemblies and portions thereof can require physically altering or replacing of an air box, installation of a cold air intake, cutting or drilling support structures, and other modifications to the interior of an engine bay.

Accordingly, there remains a need for interchangeable portions of intake systems. These and other needs are satisfied by the various aspects of the present disclosure.

SUMMARY OF THE INVENTION

In accordance with the purposes of the invention, as embodied and broadly described herein, the invention, in one aspect, relates to an intake manifold assembly that facilitates interchangeable parts.

According to one aspect, an interchangeable intake manifold assembly is a high-performance ram air intake line of interchangeable components designed to boost performance of automobiles. The intake manifold assemblies offer the ability of a user to customize an inlet horn, flare, throat, or mouth, which is visible through the grill of the vehicle, adding an aggressive and aesthetically pleasing appearance. In general, the intake bell house includes a larger inlet, converging to the stock cowl inlet already present in the vehicle.

According to one aspect, the converging, coupled with the relative speed of the vehicle, will boost air pressure to the airbox. This boosting generally increases performance. The horn, flare, throat, or mouth also increase customer appreciation due to the aggressive and aesthetically pleasing visual properties.

In still further aspects, the invention also relates to methods for interchanging portions of intake manifold assemblies and variants thereof.

According to one aspect, an apparatus may comprise a base member being defined by a rectangular aperture configured to receive and engage an automobile intake box, the base member being further defined by a perimeter surrounding the rectangular aperture and having at least one fastener or aperture configured to receive a fastener dimensioned to avoid disturbing the automobile intake box; a gooseneck member fixedly attached to the base member, the gooseneck member having a first end opening and a second end opening, the gooseneck member having an interior cavity configured to direct air into the automobile intake box from the second end opening to the first end opening through the interior cavity; and an interchangeable bell housing removably secured to the second end opening of the gooseneck member, the interchangeable bell housing having a frustoconical shaped cross section on at least one plane.

According to another aspect, an apparatus may comprise a gooseneck member fixedly attached within an engine bay of an automobile, the gooseneck member having a first end opening and a second end opening, the gooseneck member having an interior cavity configured to direct air into an automobile intake airbox from the second end opening to the first end opening through the interior cavity; and an interchangeable bell housing removably secured to the second end opening of the gooseneck member, the interchangeable bell housing having a frustoconical shaped cross section on at least one plane. According to yet another aspect, an apparatus may comprise a base member being defined by a rectangular aperture configured to receive and engage an automobile intake airbox, the rectangular aperture comprising at least four rounded corners, the base member being further defined by a perimeter surrounding the rectangular aperture and having two or more fasteners or apertures configured to receive fastener dimensioned to avoid disturbing the automobile intake airbox, the base member being formed of a rigid material; a gooseneck member fixedly attached to the base member, the gooseneck member having a first end opening and a second end opening, the first end opening being in fluid communication with the rectangular aperture, the gooseneck member having an interior cavity configured to direct air into the automobile intake airbox from the second end opening to the first end opening through the interior cavity; and an interchangeable bell housing removably secured to the second end opening of the gooseneck member, the interchangeable bell housing having a frustoconical shaped cross section on at least one plane and configured to receive air through a forward automotive intake grille arranged in front of the interchangeable bell housing such that the interchangeable bell housing is visible through the forward automotive intake grille.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1A:
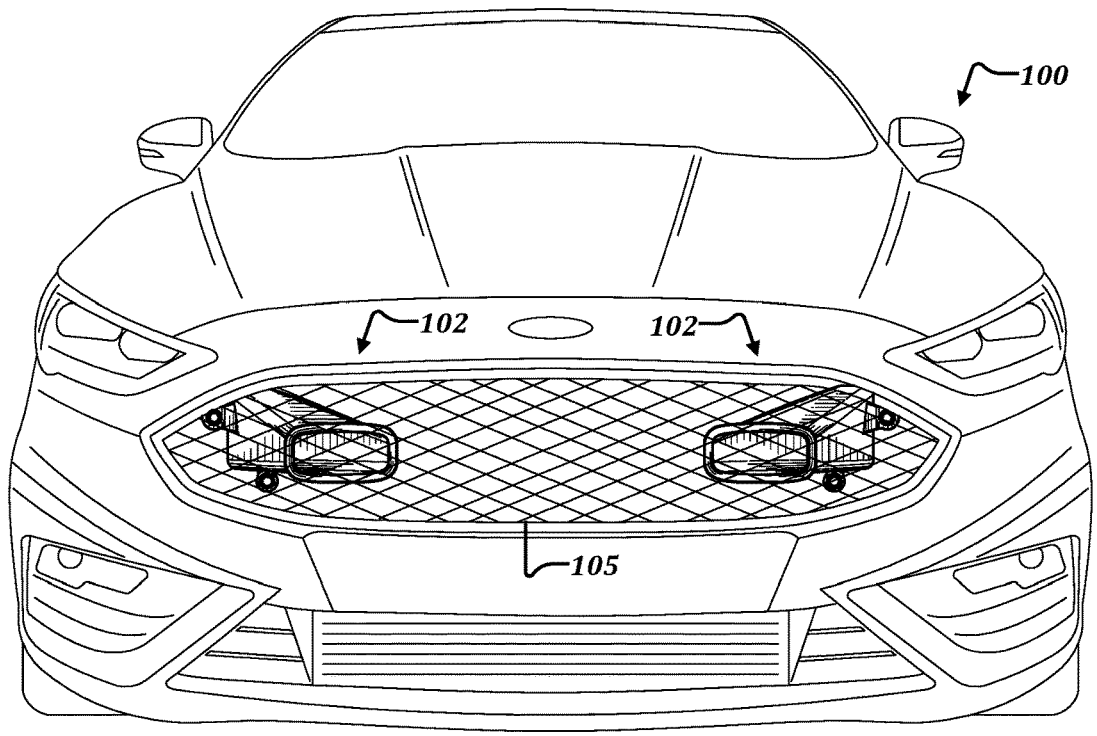
FIG. 1A illustrates a front view of an automobile with an interchangeable intake manifold assembly installed thereon, according to an exemplary embodiment.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Any and all publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

As used in the specification and the appended claims, shapes designated as triangular refer to all forms of triangles, including isosceles, right triangles, and others, unless explicitly narrowed to a particular triangle.

As used in the specification and the appended claims, shapes designated with the phrase "generally rectangular" refer to all forms of rectangular shapes, with two sets of evenly dimensioned sides, including parallelograms, perfect squares, true rectangles, and others, unless explicitly narrowed to a particular form of rectangle.

Furthermore, as used herein, the term "rectangle" and the individual term "rectangular" refers to a (plane) figure with four straight sides and four right angles, with equal or with unequal adjacent sides. A rectangle is a quadrilateral with four right angles. It can also be defined as an equiangular quadrilateral, since equiangular means that all of its angles are equal ($360°/4=90°$). It can also be defined as a parallelogram containing a right angle.

As used in the specification and the appended claims, shapes designated by other common terms such as, for example, star-like, oblong, rhomboid, and others, refer to every other similar shape that one of ordinary skill in the art would consider to be similar, unless particularly narrowed to an explicit version of the shape. For example, an equal-sided five-pointed star, or a rhomboid with at least two equally dimensioned sides, and other specific forms.

B. Intake Manifold Assemblies

As described briefly above, the present disclosure relates, in various aspects, to devices and systems for an interchangeable intake manifold assembly.

The function of the intake manifold assembly is to allow air to reach an automobile engine, or any engine for that matter. Oxygen in the air is one of the necessary gases for the engine combustion process. A good air intake system allows for clean continuous airflow into the engine, thereby achieving more power and better mileage for an automobile. It is noted that interchangeable intake manifold assemblies as described herein are applicable to naturally-aspirated engines, super-charged engines, turbo-charged engines, and any engine using external air for a combustion process.

A modern car air intake system has three main components, amongst other components that vary among engine types. The first components include an air filter. The air filter removes debris and filters particulates to improve combustion. The air filter is usually a plastic or metal box in which the air filter resides. An additional component of a modern car air intake system is the mass flow sensor. The mass flow sensor is used to determine the mass of air entering of a fuel-injected internal combustion engine. From the mass flow sensor, air entering the vehicle travels through the throttle body. The throttle body is a portion of an air intake system that controls the amount of air flowing into an engine's combustion chamber. It consists of a housing that contains a throttle plate that rotates on a shaft or other pivot mechanism.

Located directly behind the front grill, an air intake system draws air into the air filter housing, and will be mixed with the car fuel. The air will be sent to the intake manifold that supplies the fuel/air mixture to the engine cylinders for appropriate combustion.

Figure 1B:
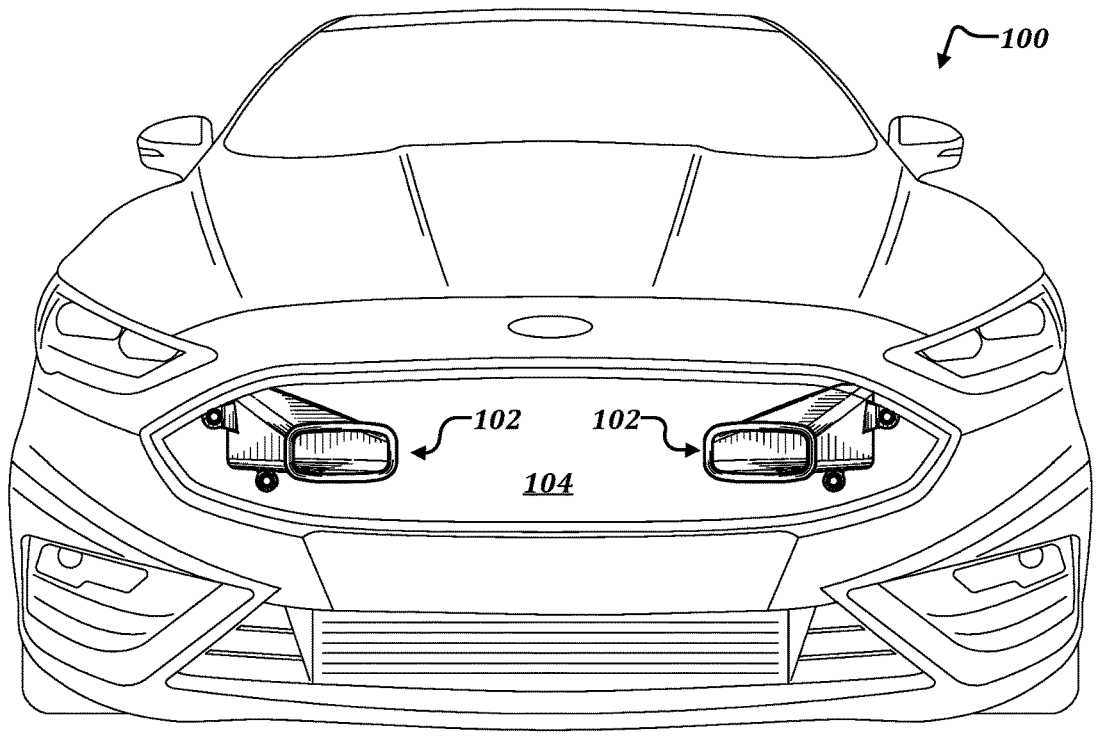
FIG. 1B illustrates a front view of the automobile of FIG. 1 with a grill portion removed for clarity of illustration, according to an exemplary embodiment.

Turning now to the drawings, FIG. 1a illustrates a front view of an automobile with an interchangeable intake manifold assembly installed thereon. As shown in FIG. 1 two interchangeable intake manifold assemblies have been installed rear of the forward intake grille 105, towards the left and right of the engine bay 104. Each interchangeable intake manifold assembly 102 includes a removable and interchangeable bell housing to change the appearance and the aesthetics of the automobile 100. For example, if main front grill es105 is removed, as shown in FIG. 1B, the placement of the interchangeable intake manifold assembly 102 are more readily visible.

FIG. 2 a illustrates a front view of an interchangeable intake manifold assembly, according to an exemplary embodiment. As shown in FIG. 2A, the interchangeable intake manifold assembly 200 includes a base member 202 structurally attached to an exterior housing 208. The interchangeable intake manifold assembly 200 further includes a front bell housing 204 which is removable and interchangeable. Further, exterior housing 208 forms an interior cavity 206 to allow air to enter and be routed to a factory airbox.

The interchangeable intake manifold assembly 200 also includes fastener or aperture 212 arranged for allowing the fastening of the interchangeable intake manifold assembly 200 to a standard automobile, with a standard airbox, without structural modifications to the engine bay 104. It is noted that, according to some aspects, trimming of the shroud (e.g., see FIG. 3 and FIG. 4; 112) may be necessary to install the interchangeable intake manifold assembly 200 to an automobile 100.

Figure 2A:
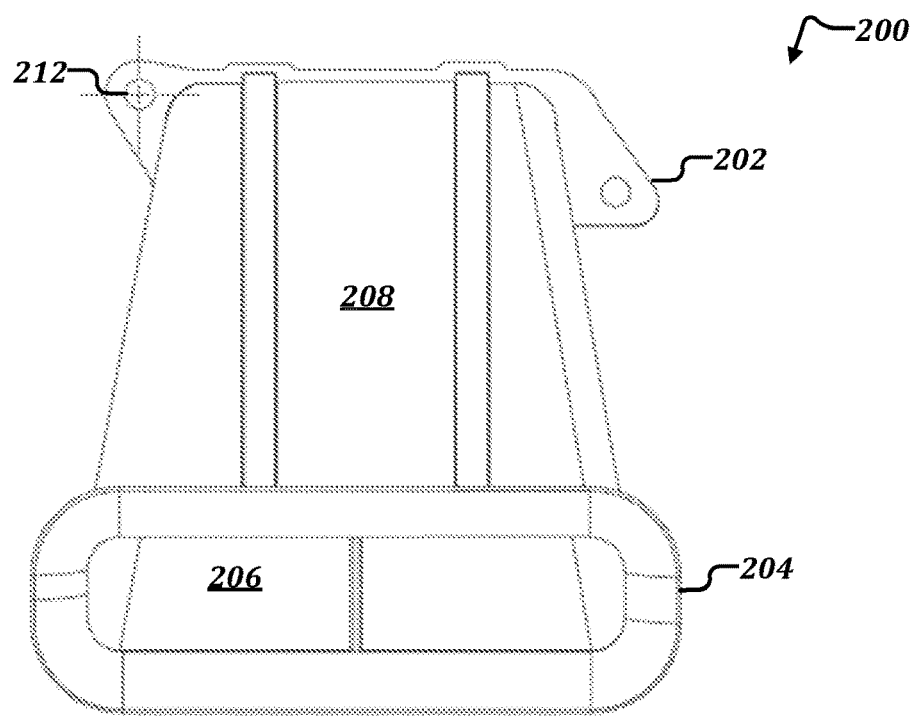
FIG. 2A illustrates a front view of an interchangeable intake manifold assembly, according to an exemplary embodiment.
Figure 2B:
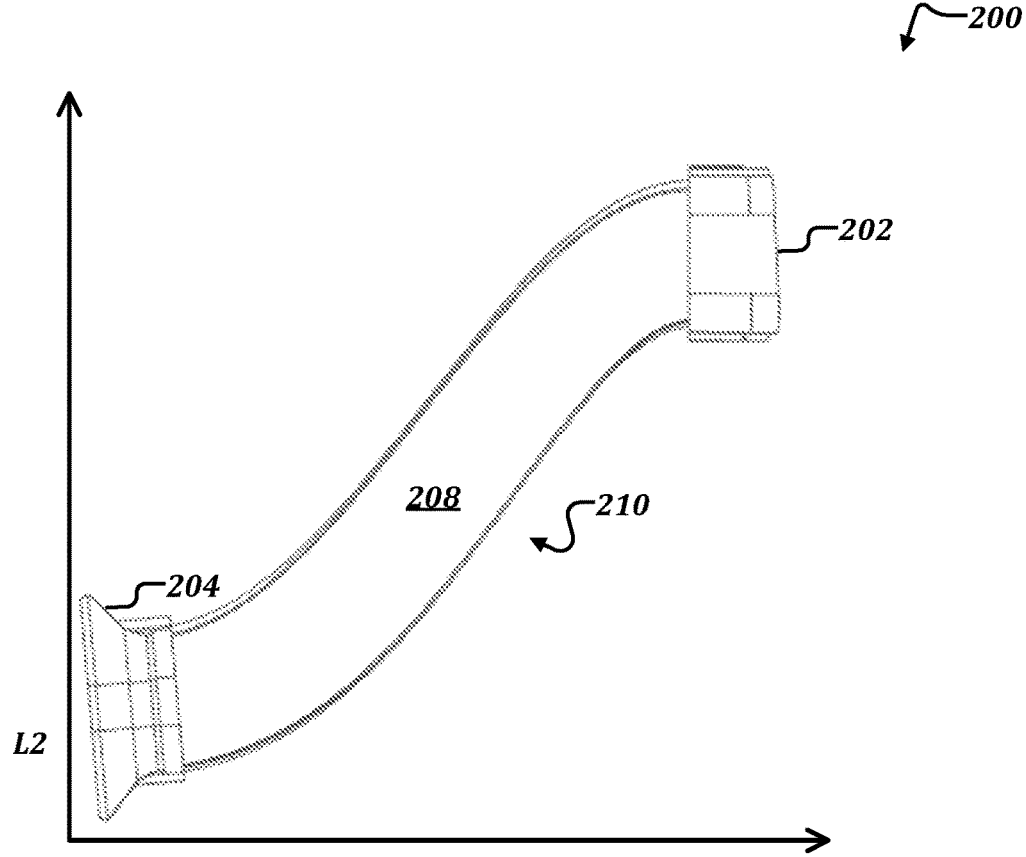
FIG. 2B illustrates a side view of an interchangeable intake manifold assembly, according to an exemplary embodiment.

FIG. 2B illustrates a side view of an interchangeable intake manifold assembly, according to an exemplary embodiment. As shown, the gooseneck portion 210 has an overall vertical height of L2 and a horizontal width of L1. The horizontal width L1 allows the interchangeable intake manifold assembly 200 to be installed on a standard automobile-no matter how forward of the engine-without requiring cutting to route the front bell housing 204 behind the front grille.

Furthermore, the scooping cross-sectional area of the forward bell housing 204 allows the collection of air which is then forcibly passed through the interior cavity 206 formed by the exterior housing 208 such that it exits at the standard base member 202 for entry into the car's intake manifold.

Figure 2C:
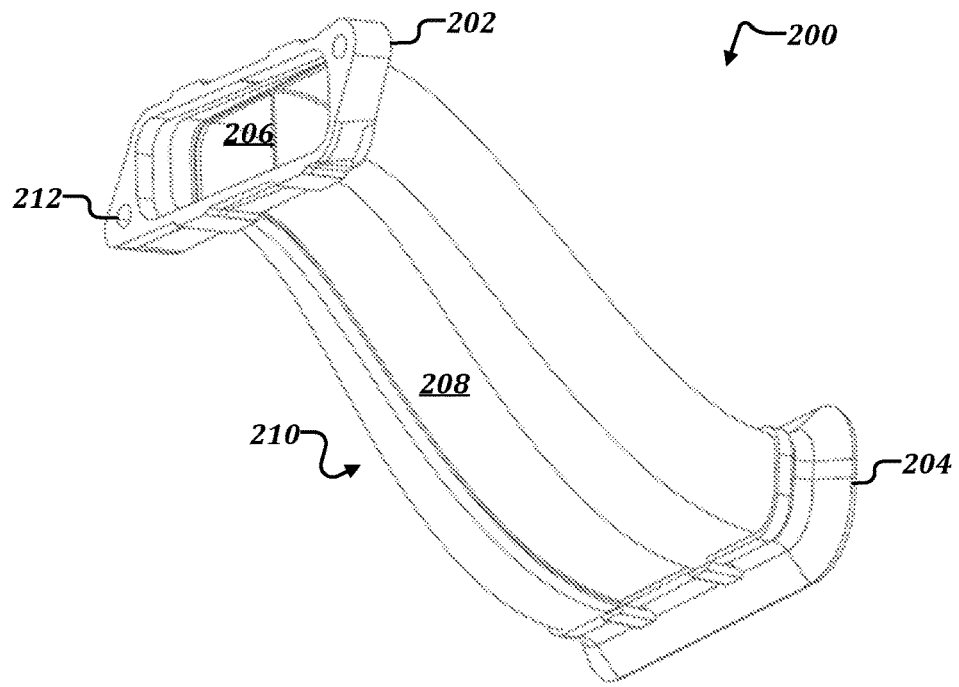
FIG. 2C illustrates a rear perspective view of an interchangeable intake manifold assembly, according to an exemplary embodiment.
Figure 2D:
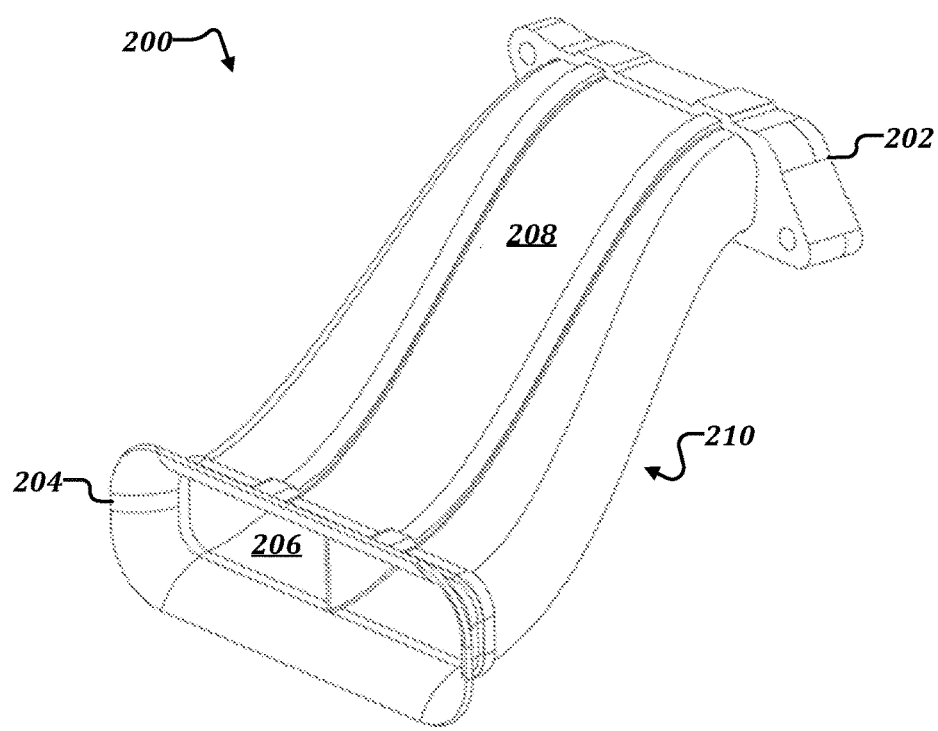
FIG. 2D illustrates a front perspective view of an interchangeable intake manifold assembly, according to an exemplary embodiment.

FIG. 2C illustrates a rear perspective view of an interchangeable intake manifold assembly, and FIG. 2D illustrate a forward perspective view of the interchangeable intake manifold assembly 200, according to an exemplary embodiment. As shown, the downward arrangement of gooseneck member 210 allows for readily increased airflow while also allowing customization through a user's choice of the forward bell housing 204.

Accordingly, as illustrated in FIGS. 2A-2D, the interchangeable intake assembly 200 includes the base member 202. The base member 202 is defined by a rectangular aperture configured to receive and engage an automobile intake airbox.

The base member 202 is also defined by a perimeter surrounding the rectangular aperture and having at least one fastener or aperture 212 configured to receive a fastener dimensioned to avoid disturbing the automobile intake airbox. In some embodiments, the base member 202 may have at least one protrusion disposed on an outer portion of the perimeter, each of the at least one protrusion having at least one fastener and/or aperture configured to receive a fastener dimensioned to avoid disturbing the automobile intake airbox.

The gooseneck member 210 is or may be fixedly attached to the base member 202. Additionally, the gooseneck member 210 has a first end opening and a second end opening. The gooseneck member 210 also has an interior cavity 206 configured to direct air into the automobile intake airbox from the second end opening to the first end opening through the interior cavity (e.g., from bell housing 204 to base member 202).

The interchangeable intake manifold assembly 200 also includes the interchangeable bell housing 204. The bell housing 204 may be removably secured to the second end opening of the gooseneck member 210 and/or exterior housing 208. The bell housing 204 may have a frustoconical shaped cross section on at least one plane intersecting the bell housing 204 on an axis orthogonal to initial airflow. More specifically, the bell housing 204 is bell shaped along at least one plane. According to some aspects, the bell housing 204 is truly bell-shaped, at least in cross section, but may have many frontal shapes. The bell housing may have at least one groove on a portion of the interchangeable bell housing removably secured to the second end opening of the gooseneck member, and at least one flange disposed on an outer portion of the gooseneck member, each of the at least two flange dimensioned to receive each of the at least one groove in direct adjoinment on at least one side. The bell housing may further be is removably secured to the second end opening of the gooseneck member via directly adjoining four sides of an inner portion of the interchangeable bell housing to four sides of an outer portion and/or exterior housing 208 of the gooseneck member.

According to some embodiments, the rectangular aperture at the base member 202 includes at least one rounded corner. According to other embodiments, the rectangular aperture includes at least four rounded corners configured to directly engage a standard automotive airbox. For example, some automotive manufacturers include an airbox with four rounded corners having clips or pins to retain the factory bell housing. The rectangular aperture may be dimensioned to engage the exterior of this portion of the airbox and have rounded corners at least partially matching this profile.

As shown in FIG. 2C, the base member 202 can be further defined by having a generally rectangular shape encompassing the perimeter portion and fastener or aperture 212. This generally rectangular shape can be a rhomboid or parallelogram dimensioned to engage existing fasteners or apertures configured to receive fasteners existing in an automobile.

As shown in FIGS. 1A-1B, and with reference to FIG. 2C, the gooseneck member 210 can be dimensioned to support the interchangeable bell housing 204 to be visible external to an automobile. For example, visibility may be through a forward intake grille 105. Accordingly, in some embodiments, the phrase "visible external to the automobile" refers to visibility behind a forward intake grille 105 of the automobile 100.

With regard to construction, the base member 202 and/or the gooseneck member 210 can be formed of metal, plastic, fused metal, 3-D printed material, or rigid material. Other material compositions may also be applicable. For example, rigid or semirigid rubber or hardened elastomers may be used in some applications. Furthermore, composite materials such as fiberglass or glass-reinforced resin or phenolic resin may be used. Still further, any rigid material capable of supporting the gooseneck member 210 and bell housing 204 may be applicable, as the interchangeable intake manifold assembly 200 is situated forward of the engine bay 104 and therefore not subject to typical engine temperatures in most applications.

Additionally, the interchangeable bell housing 204 may be formed of metal, plastic, injection-molded plastic, 3-D printed plastic, or a rigid material. The interchangeable bell housing 204 can also be formed of integrally formed colored material or coated in paint. For example, colorized plastic or rubber may be used in some applications. Still further, the integrally formed colored material or paint can be metallic or reflective.

Hereinafter, installation of an interchangeable intake assembly is described in detail. It is readily understood that alterations of the steps and/or methods of installation described may be applicable depending upon a particular model of automobile and/or whether the automobile is presently being modified and lacks some parts described below.

Figure 3:
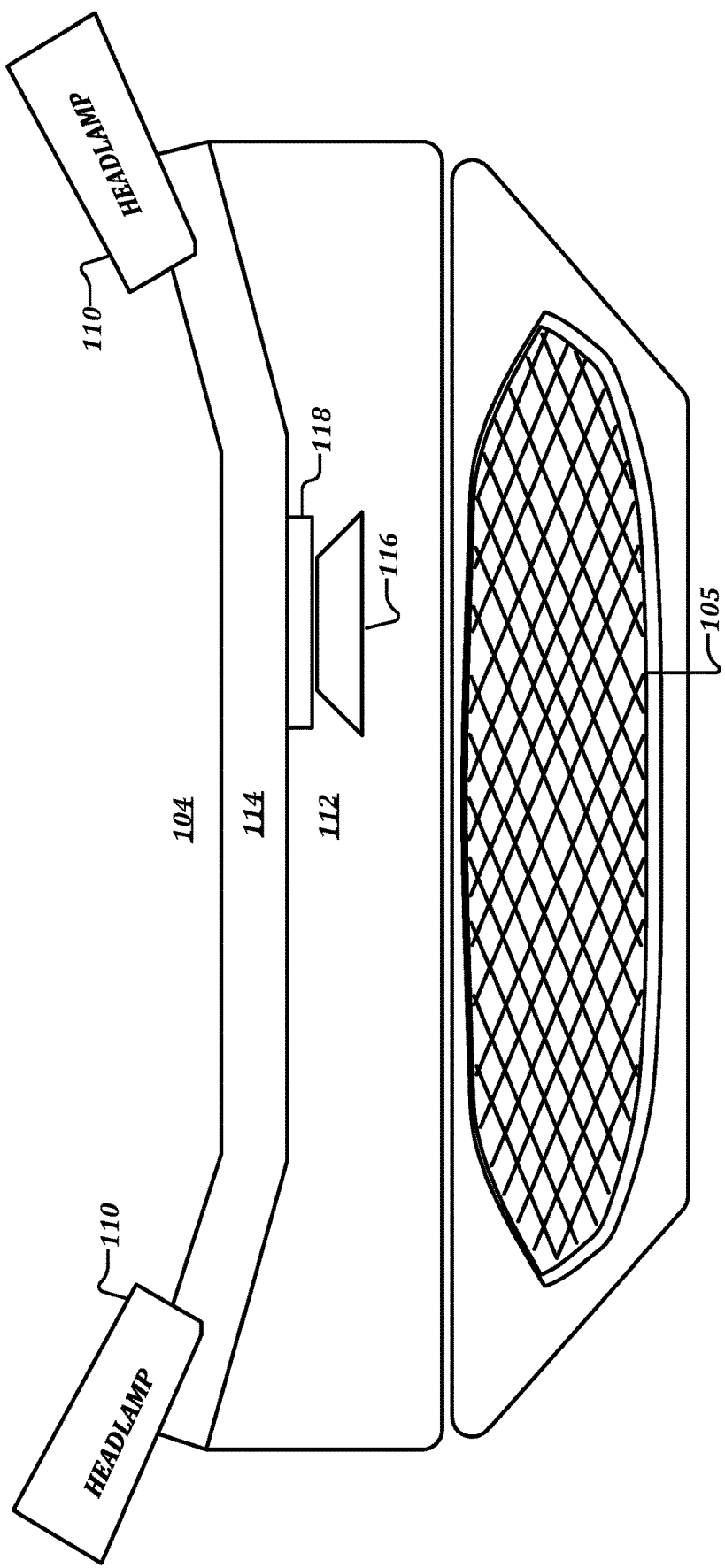
FIG. 3 illustrates an engine bay of an automobile prior to installation of an interchangeable intake manifold assembly, according to an exemplary embodiment.

FIG. 3 illustrates an engine bay of an automobile prior to installation of an interchangeable intake manifold assembly, such as interchangeable intake manifold assembly 200, according to an exemplary embodiment. The illustrated view of the engine bay 104 is a top-down perspective, showing the forward intake grille 105, the stock bell housing 116, and the stock automobile intake airbox 118. Additionally, some automotive manufacturers install a shroud 112 (e.g., plastic shroud) that may obstruct the view of the stock bell housing 116. Finally, structurally, the standard or stock automobile intake airbox 118 is supported through the forward cowl 114.

Headlamps 110 are generally towards the left and right of the forward cowl 114 and may be supported therefrom. Additionally, the forward intake grille 105 may initially obstruct the view of the stock bell housing 116. Thus, the forward intake grille 105 and shroud 112 may be removed for better access to remove stock components and/or replace stock components.

Figure 4:
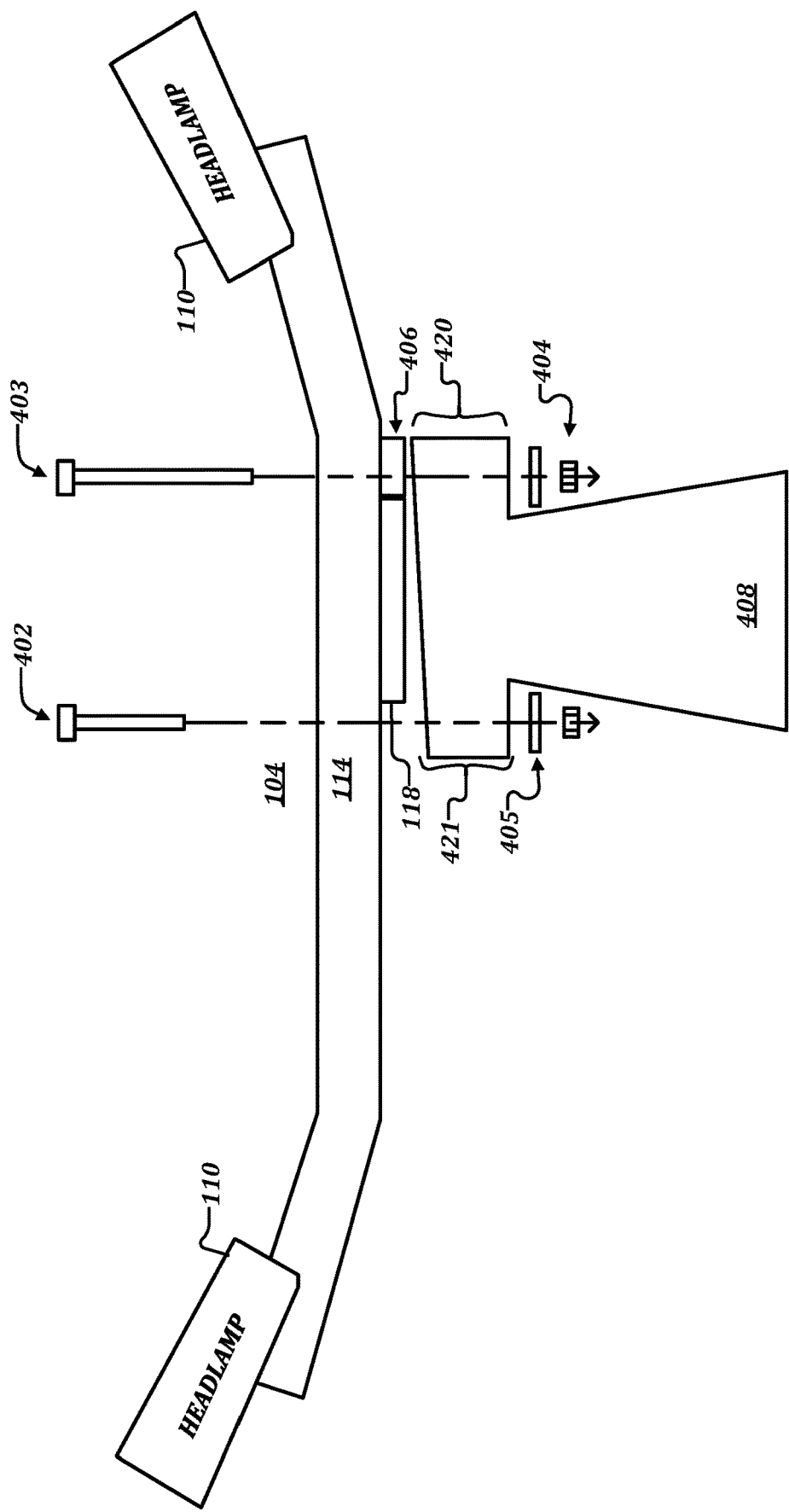
FIG. 4 illustrates an engine bay of an automobile during installation of an interchangeable intake manifold assembly, according to an exemplary embodiment.

FIG. 4 illustrates an engine bay of an automobile during installation of an interchangeable intake manifold assembly, such as interchangeable intake manifold assembly 200, according to an exemplary embodiment. As illustrated, two or more fasteners 402 and 403 are passed adjacent to the stock automobile intake airbox 118. Furthermore, a spacer component or spacer assembly 406 is included to receive the fastener 403.

The spacer allows the gooseneck member of an interchangeable intake manifold assembly to be appropriately situated due to the trapezoidal cross-section of the standard base member 202, denoted by 420 and 421. Upon mounting, spacer washer 405 and or fastener nut 404 may be tightened amongst fasteners 402, and 403 to finish installation. After installation, the interchangeable intake manifold assembly 408 may be customized using an interchangeable front bell housing, such as any bell housing described herein.

Figure 5:
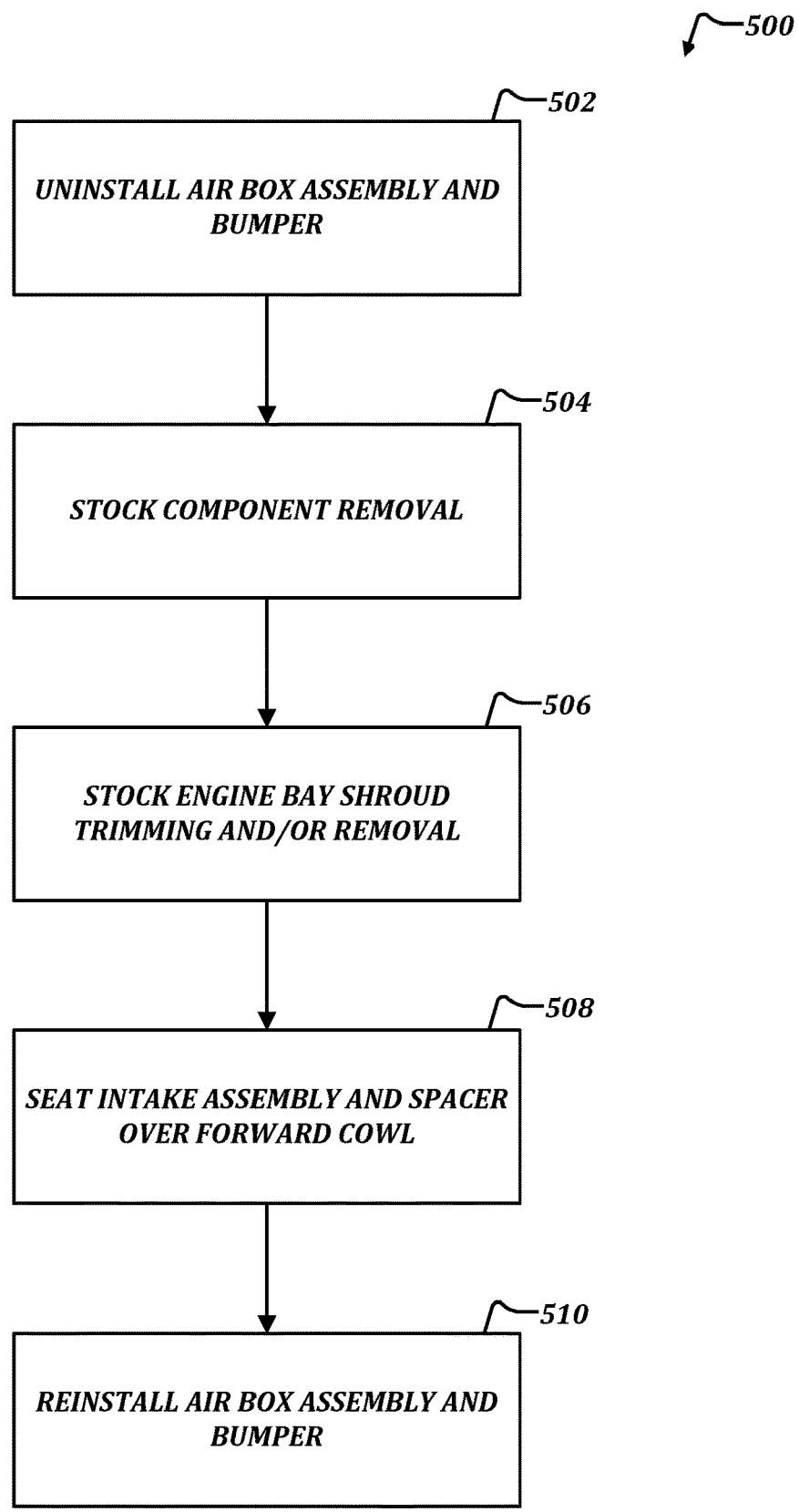
FIG. 5 is a flowchart of a method of installing an interchangeable intake manifold assembly, according to an exemplary embodiment.
Figure 6:
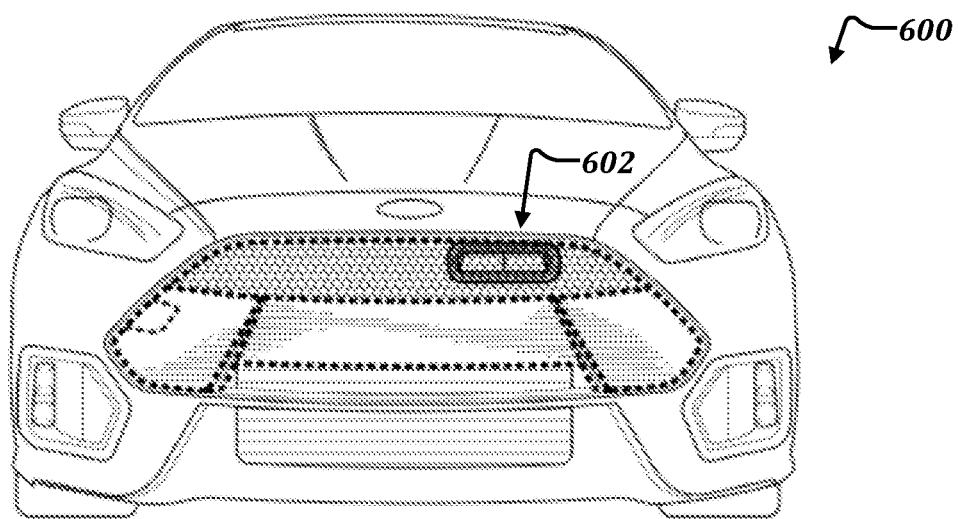
FIG. 6 illustrates a front view of an automobile with an interchangeable intake manifold assembly installed thereon, according to an exemplary embodiment.
Figure 7:
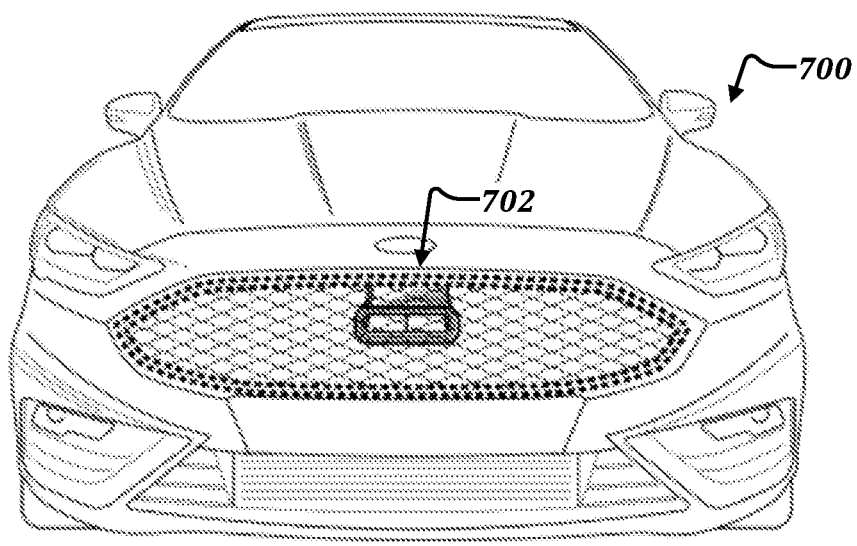
FIG. 7 illustrates a front view of an automobile with an interchangeable intake manifold assembly installed thereon, according to an exemplary embodiment.
Figure 8:
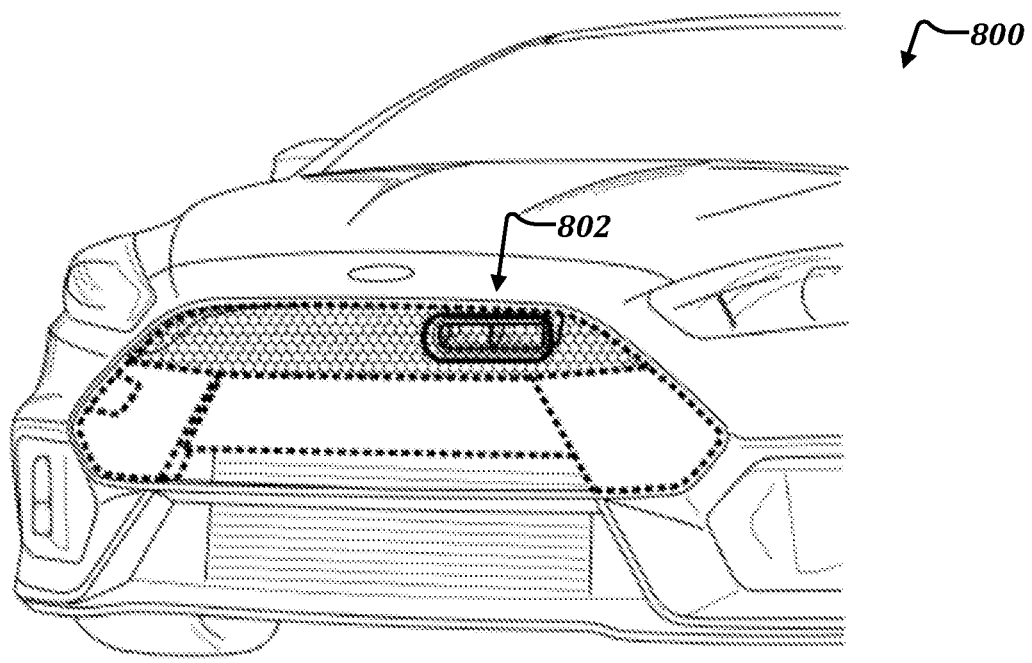
FIG. 8 illustrates a front view of an automobile with an interchangeable intake manifold assembly installed thereon, according to an exemplary embodiment.
Figure 9:
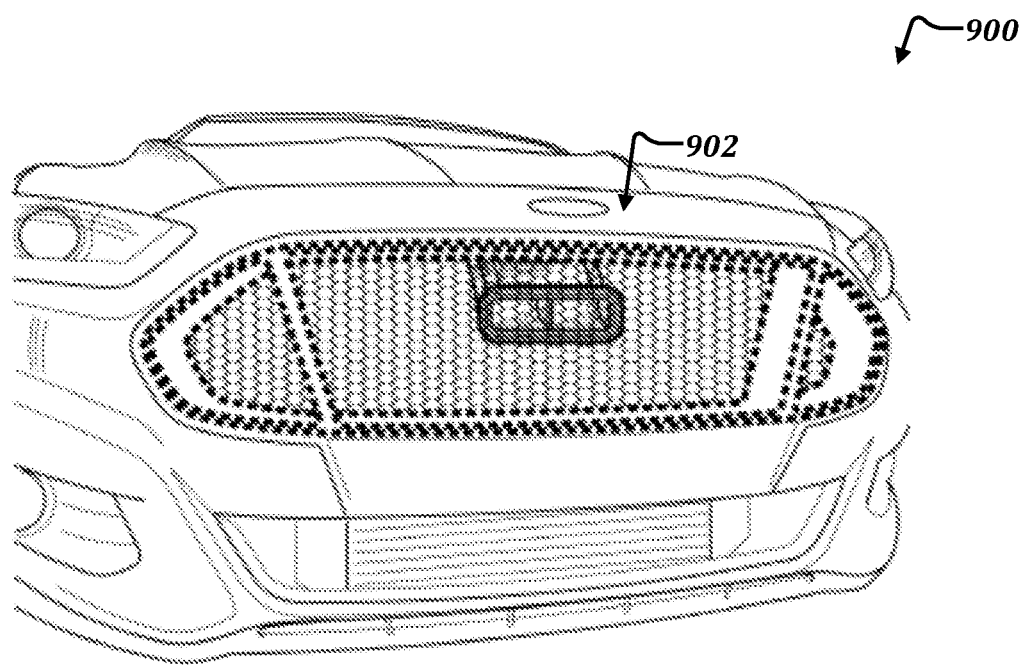
FIG. 9 illustrates a front view of an automobile with an interchangeable intake manifold assembly installed thereon, according to an exemplary embodiment.

FIG. 5 is a flowchart of a method 500 of installing an interchangeable intake manifold assembly, according to an exemplary embodiment. The method 500 includes uninstalling a stock automobile intake airbox and front bumper/forward grille of an automobile at block 502. Upon access to the stock automobile intake airbox, the method 500 includes stock component removal of the factory or stock bell housing, at block 504.

The method 500 further includes trimming and/or removal of a stock engine bay shroud, if a user desires, at block 506. Thereafter, the method 500 includes seating the new interchangeable intake manifold assembly and spacer over the forward cowl utilizing the fasteners 402 and 403.

The method 500 further includes reinstalling an automobile intake airbox or assembly (if removed, and rearward of the base member 202) and front bumper or any decorative items removed from the front of the automobile, at block 510.

As illustrated in FIGS. 6-9, multiple physical locations for different interchangeable air intake assemblies 602, 702, 802, 902 may be chosen by a user of automobiles 600, 700, 800, and 900, depending on the aesthetic design and location of the stock automobile intake airbox.

Figure 10:
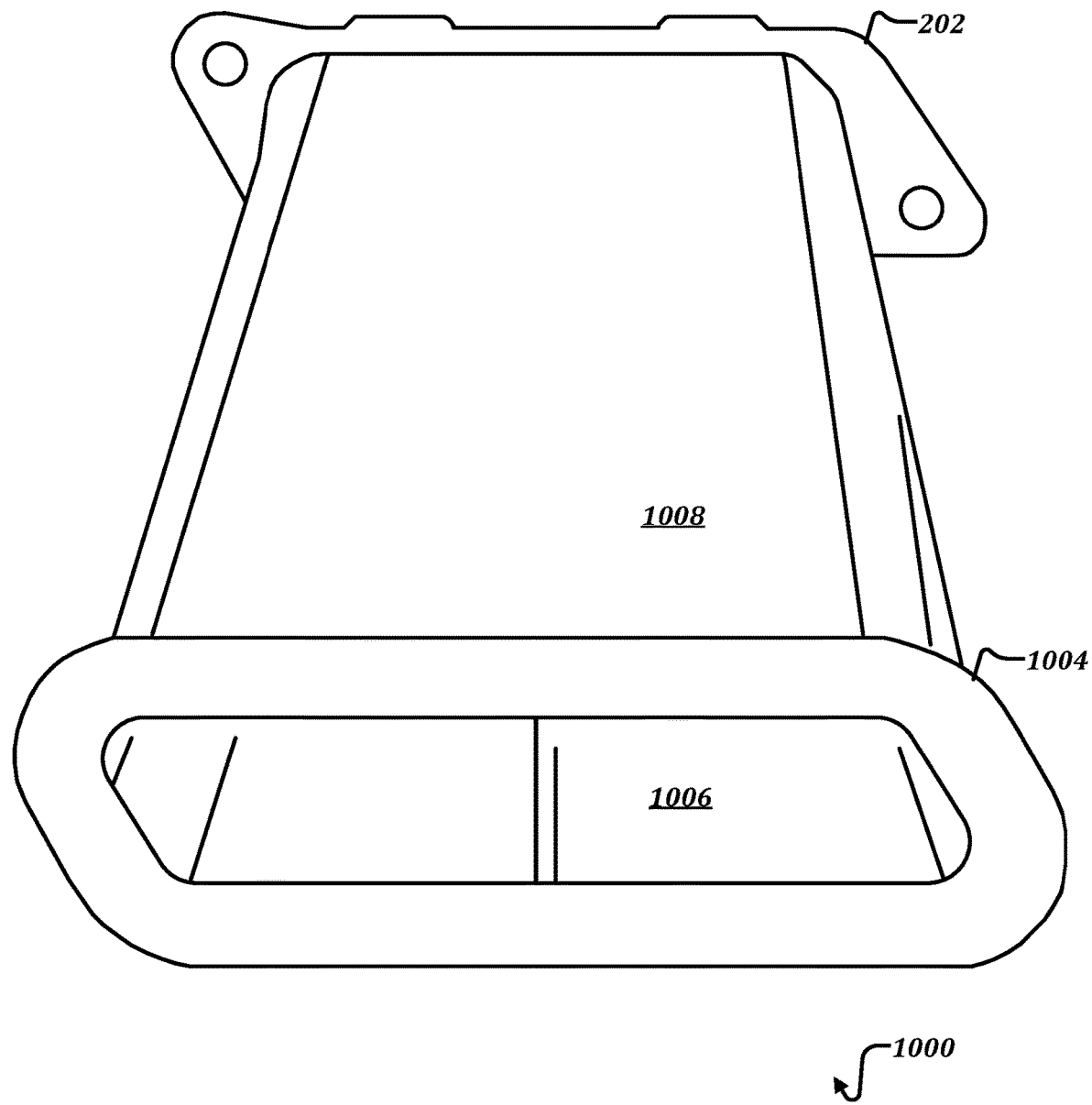
FIG. 10 illustrates a front view of an interchangeable intake manifold assembly, according to an exemplary embodiment.

FIG. 10 illustrates a front view of an interchangeable intake manifold assembly, according to an example embodiment. As shown in FIG. 10, the interchangeable intake manifold assembly 1000 includes a common base member 202. Common base member 202 may be fixedly attached to exterior housing 1008. The exterior housing 1008 defines an interior cavity 1006 to receive intake air directed by the bell housing 1004.

Although the bell housing 1004 has a general parallelogram shape, it may be interchanged with several different bell housings to change the look, appearance, and aesthetics of a vehicle that it is installed in.

Figure 11:
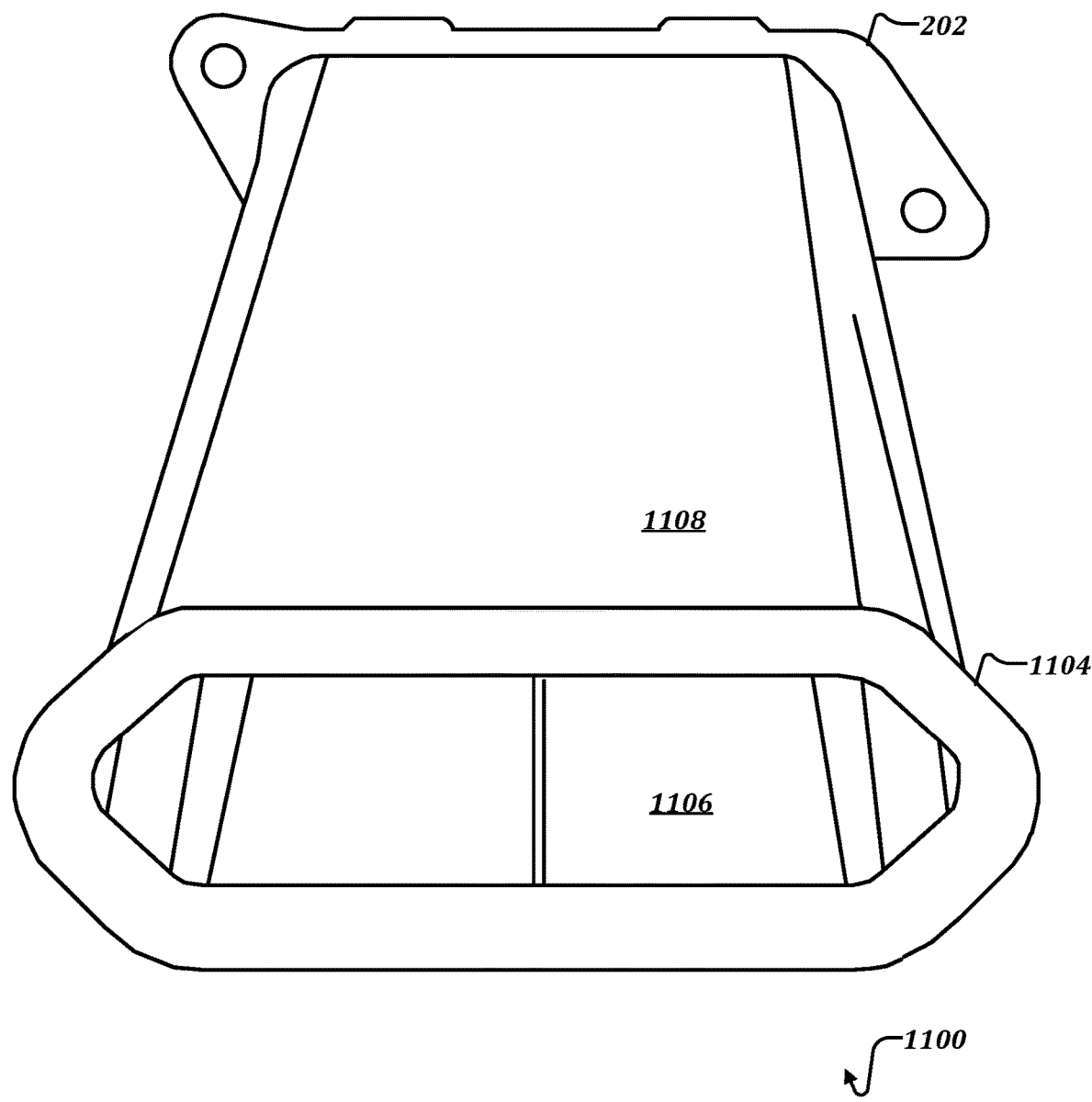
FIG. 11 illustrates a front view of an interchangeable intake manifold assembly, according to an exemplary embodiment.
Figure 12:
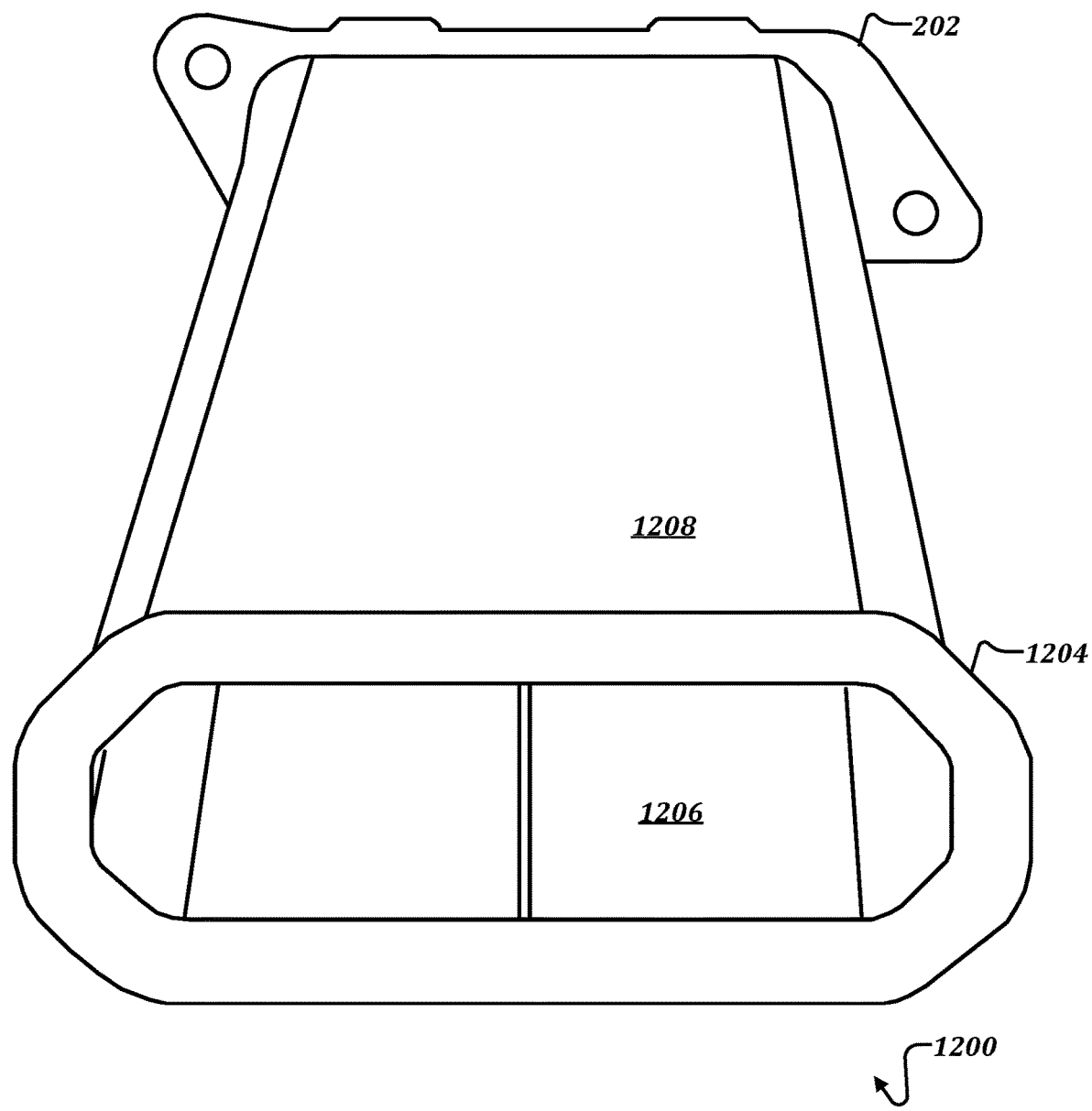
FIG. 12 illustrates a front view of an interchangeable intake manifold assembly, according to an exemplary embodiment.
Figure 13:
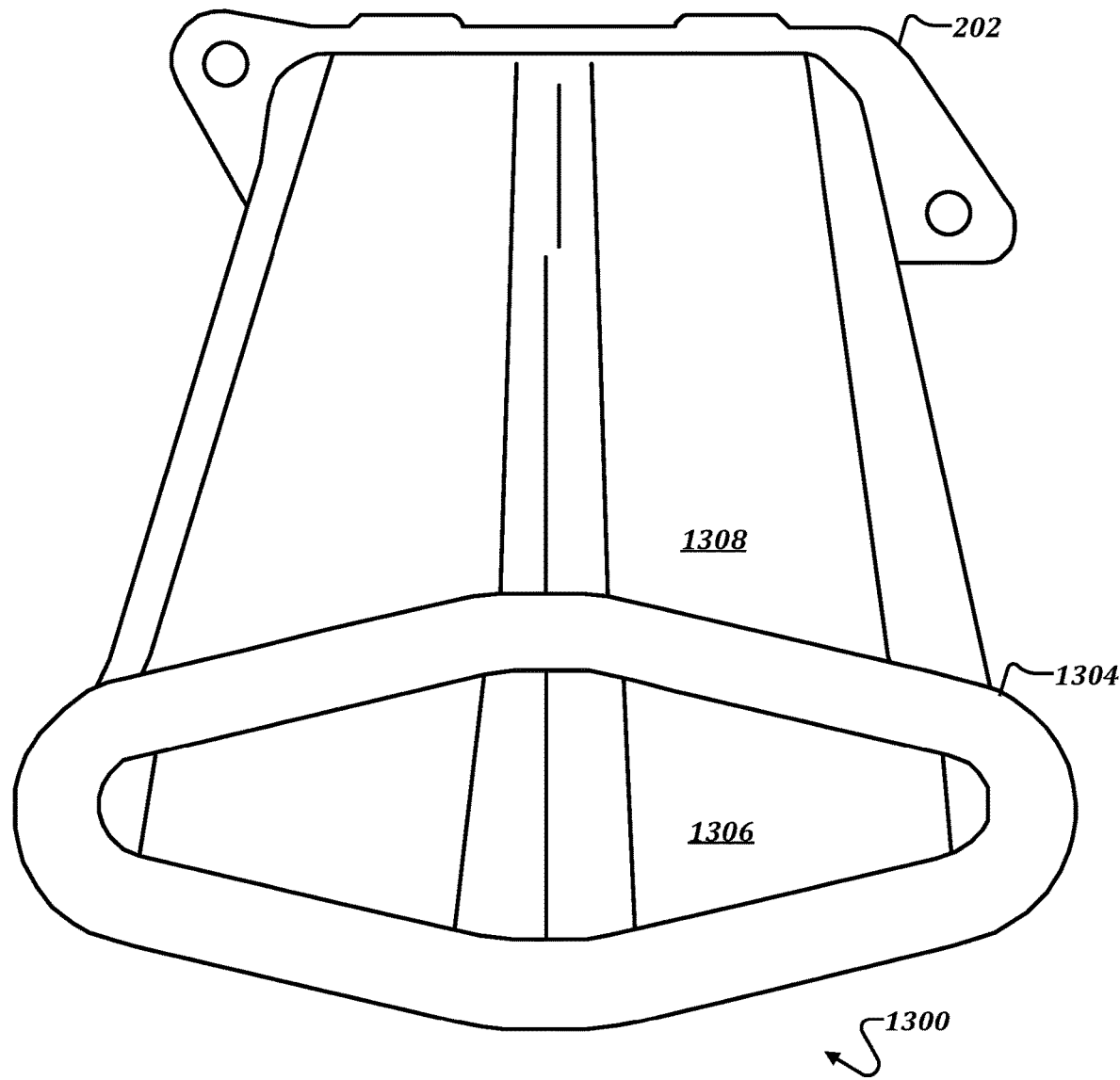
FIG. 13 illustrates a front view of an interchangeable intake manifold assembly, according to an exemplary embodiment.

For example, FIG. 11 illustrates a front view of an interchangeable intake manifold assembly 1100. Interchangeable intake manifold assembly 1100 also includes the common base member 202, with the exterior housing 1108 fixedly attached thereto.

The exterior housing 1108 includes or defines an interior cavity 1106 configured to receive ram air from the bell housing 1104.

The bell housing 1104 is fully interchangeable without further modifications to the bell housing 1004. For example, as illustrated in FIGS. 12, 13, and 18A-H each interchangeable intake manifold assembly 1200 and/or 1300 includes the common base member 202 and the exterior housing 1208, 1308 fixedly attached thereto, which further defines an interior cavity 1206, 1306. The exterior housings 1208, 1308 are each configured to receive any of the bell housings 1004, 1104, 1204, 1304.

Moreover, additional designs and shapes are also possible. For example, additional bell housings can include virtually any shape, including but not limited to, rhomboids, perfect squares, rectangles, triangles, diamond shapes, star patterns, oblong or egg shapes, and any other suitable shape configurable to be attached to an exterior housing at least somewhat similar to exterior housing 1008, 1108, 1208, and/or 1308.

Figure 14:
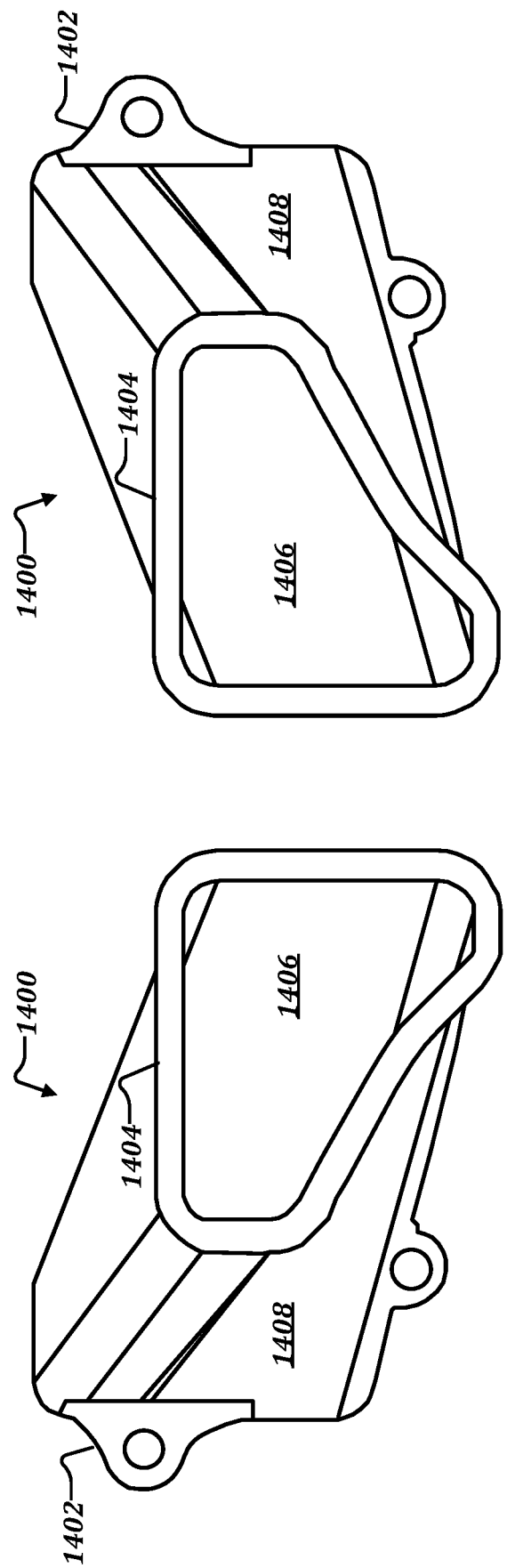
FIG. 14 illustrates a front view of an interchangeable intake manifold assembly, according to an exemplary embodiment.

Turning now to FIG. 14 an additional front view of an interchangeable intake manifold assembly 1400 is illustrated. The interchangeable intake manifold assemblies 1400 are configured to be installed in a dual intake manifold system. The common backup base members 1402 may be fixedly attached to exterior housings 1408. Exterior housings 1408 are configured to receive a bell assembly or bell intake 1404 such that air is directed to interior cavities 1406, and further is received by the intake manifold(s) of an automobile.

Figure 15:
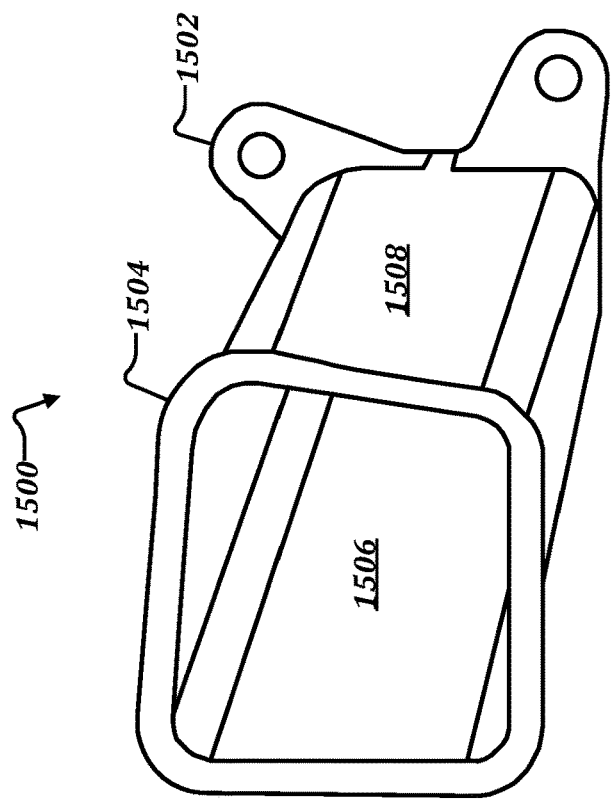
FIG. 15 illustrates a front view of an interchangeable intake manifold assembly, according to an exemplary embodiment.
Figure 15:
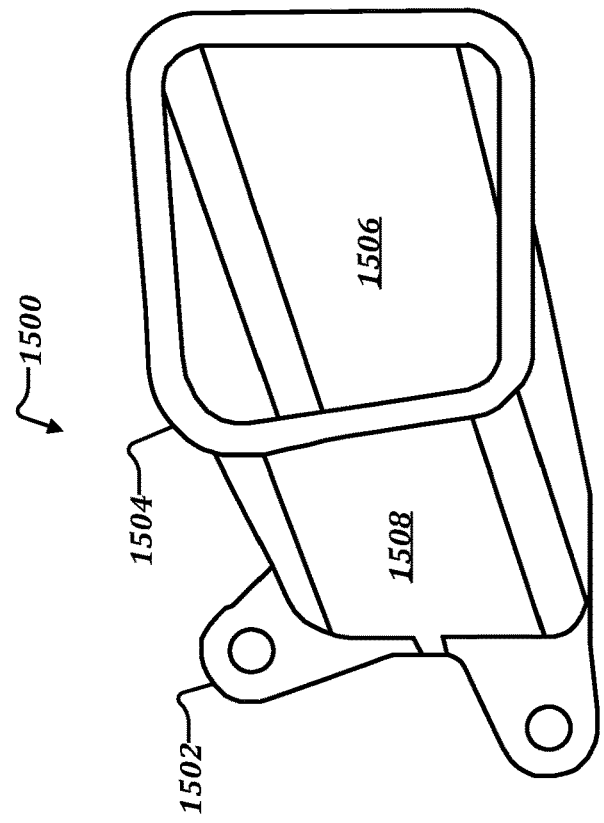
Figure 16:
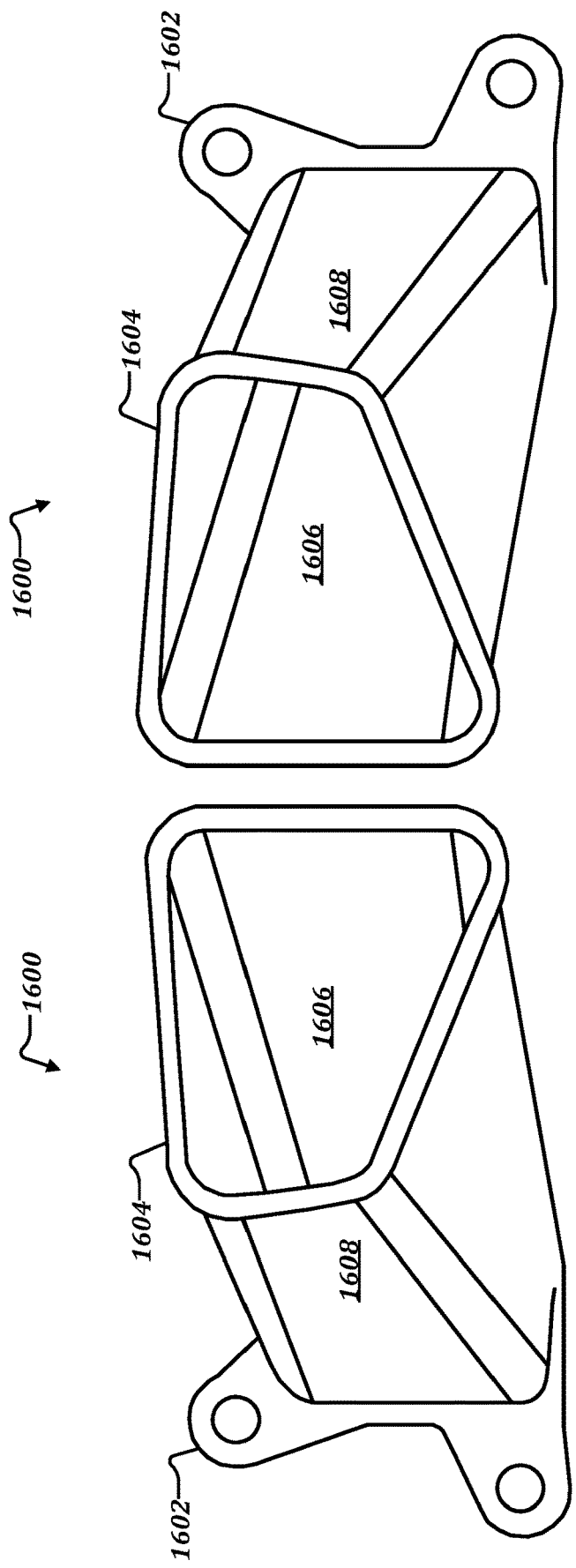
FIG. 16 illustrates a front view of an interchangeable intake manifold assembly, according to an exemplary embodiment.
Figure 17:
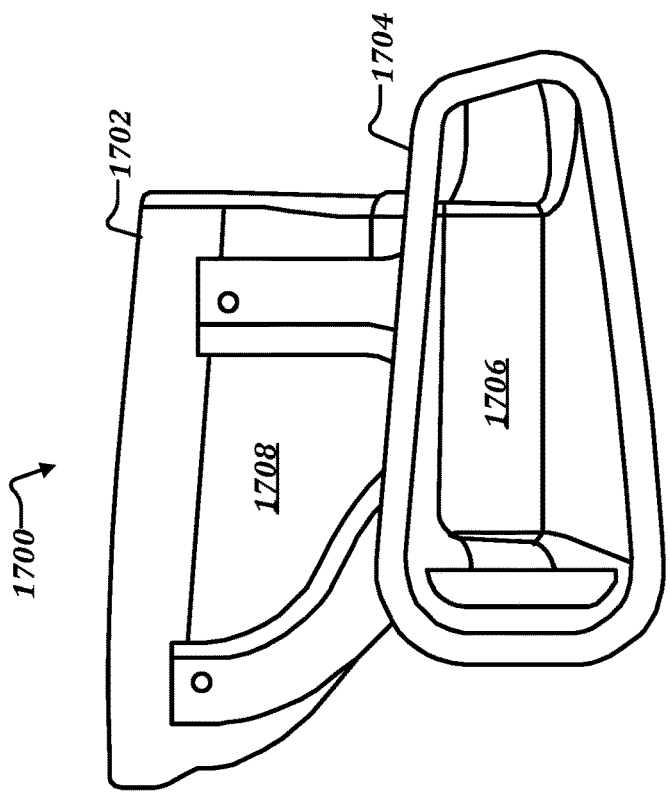
FIG. 17 illustrates a front view of an interchangeable intake manifold assembly, according to an exemplary embodiment.
Figure 17:
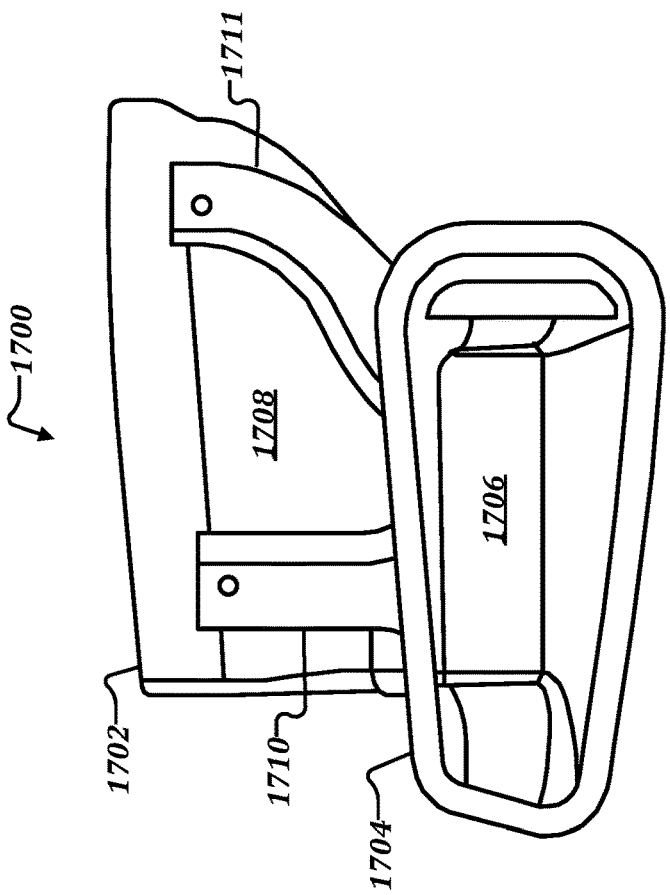
Figure 18A:
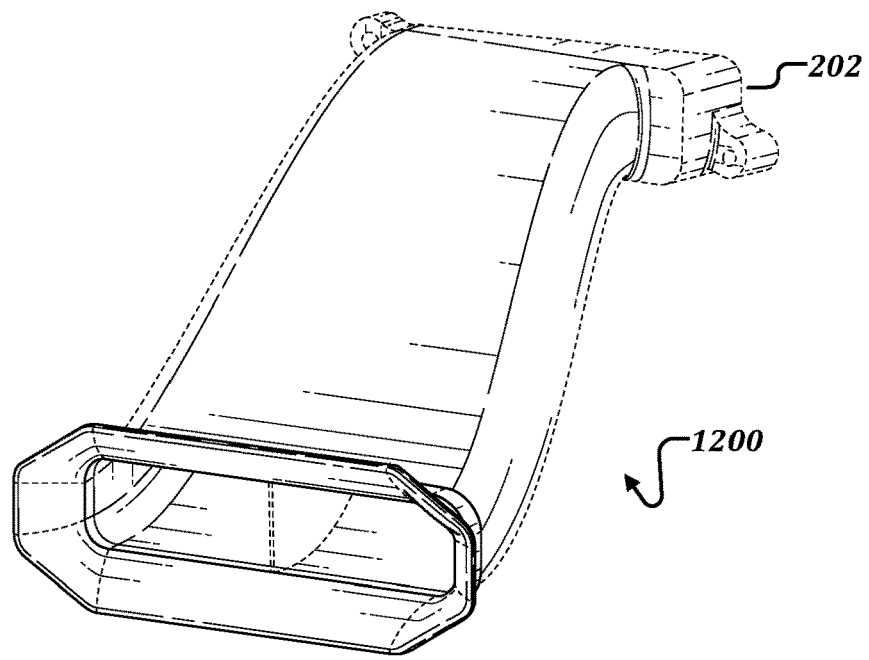
FIG. 18A illustrates a perspective view of an interchangeable intake manifold assembly.
Figure 18B:
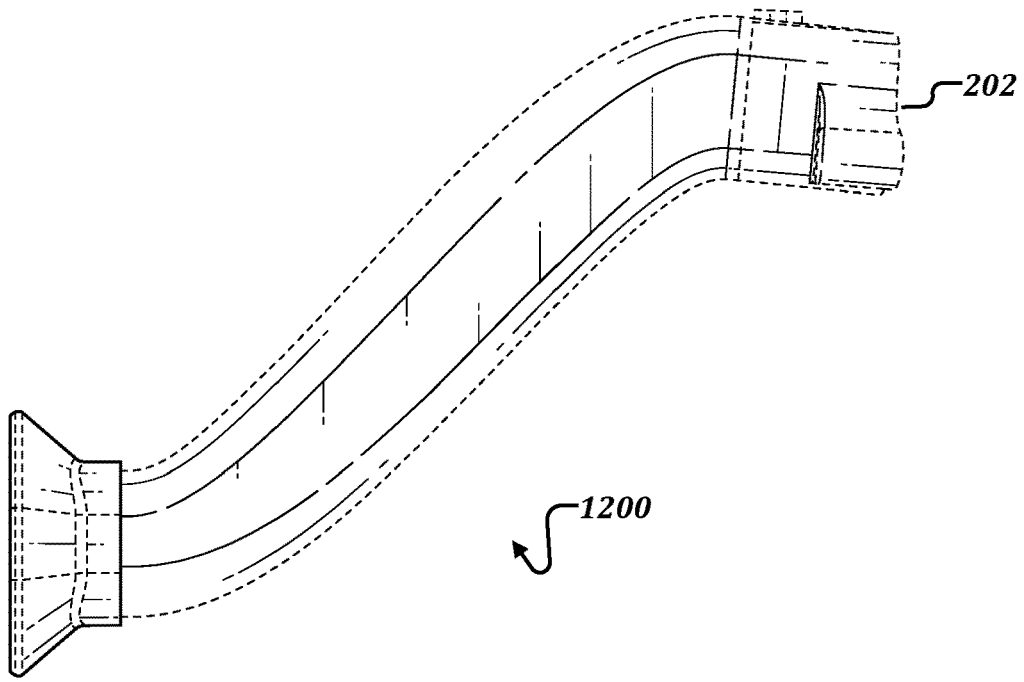
FIG. 18B illustrates a side view of an interchangeable intake manifold assembly.
Figure 18C:
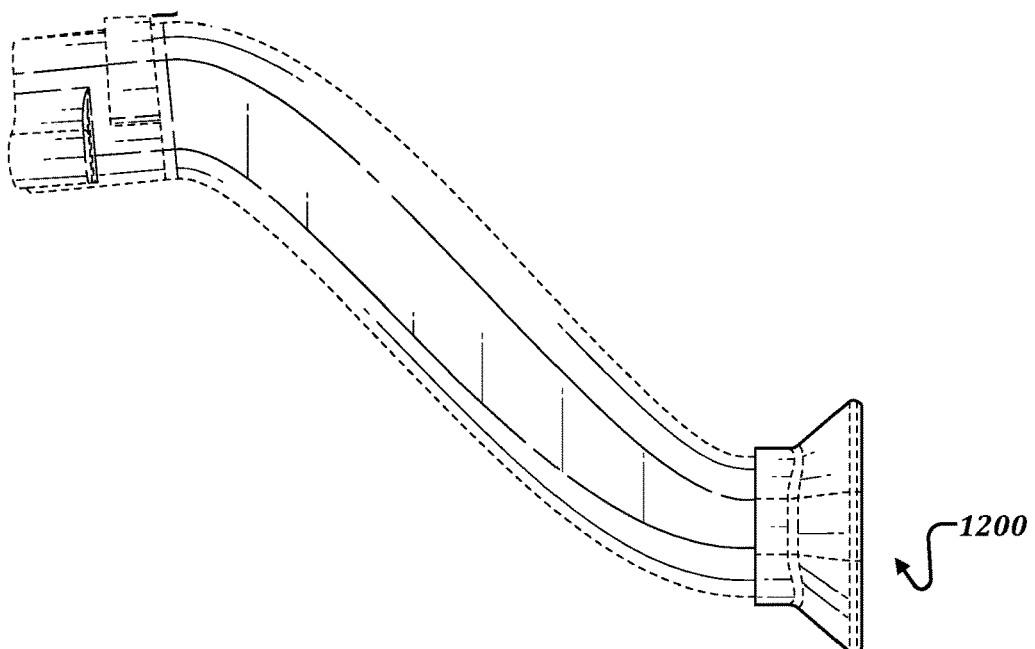
FIG. 18C illustrates another side view of an interchangeable intake manifold assembly.
Figure 18D:
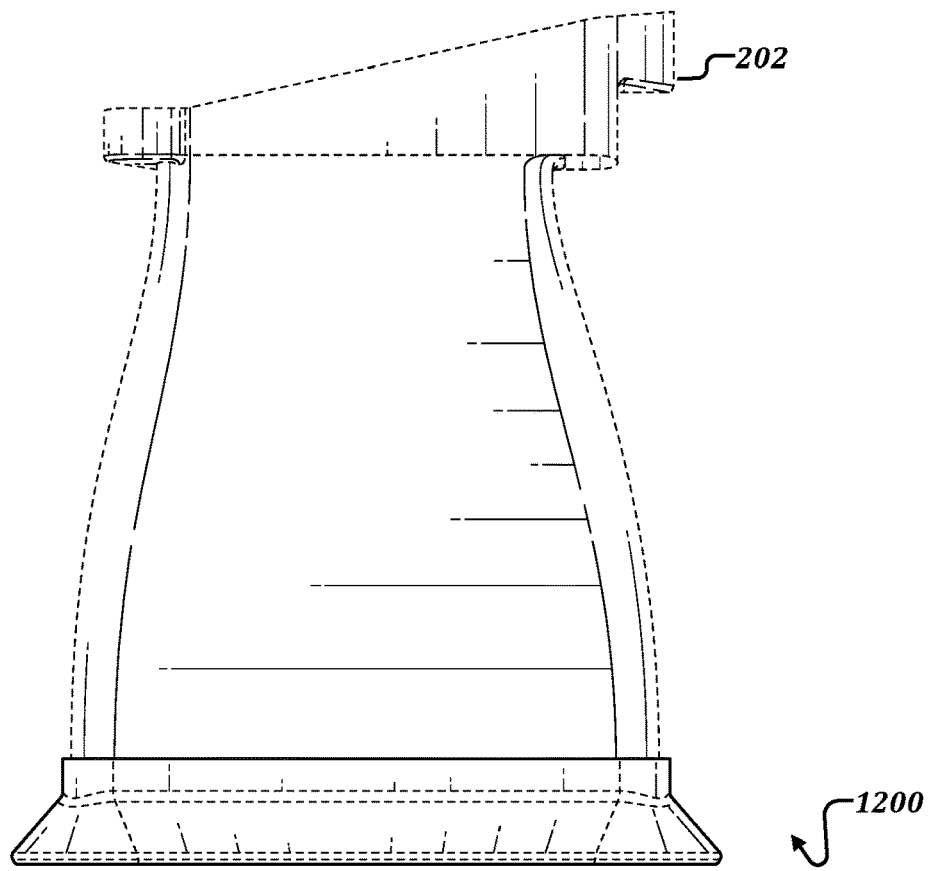
FIG. 18D illustrates a top view of an interchangeable intake manifold assembly.
Figure 18E:
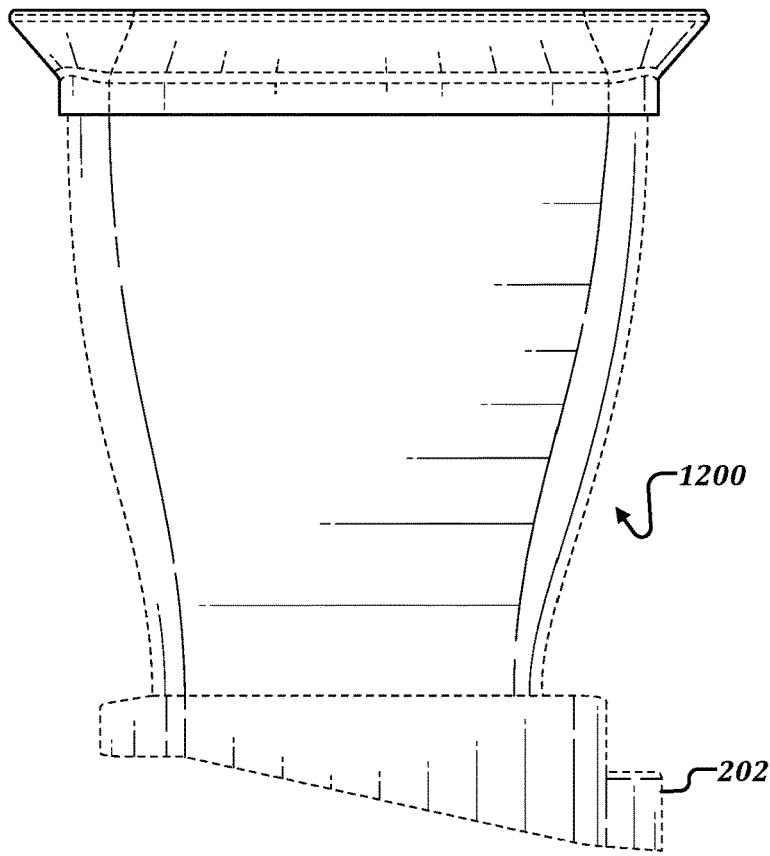
FIG. 18E illustrates a bottom view of an interchangeable intake manifold assembly.
Figure 18F:
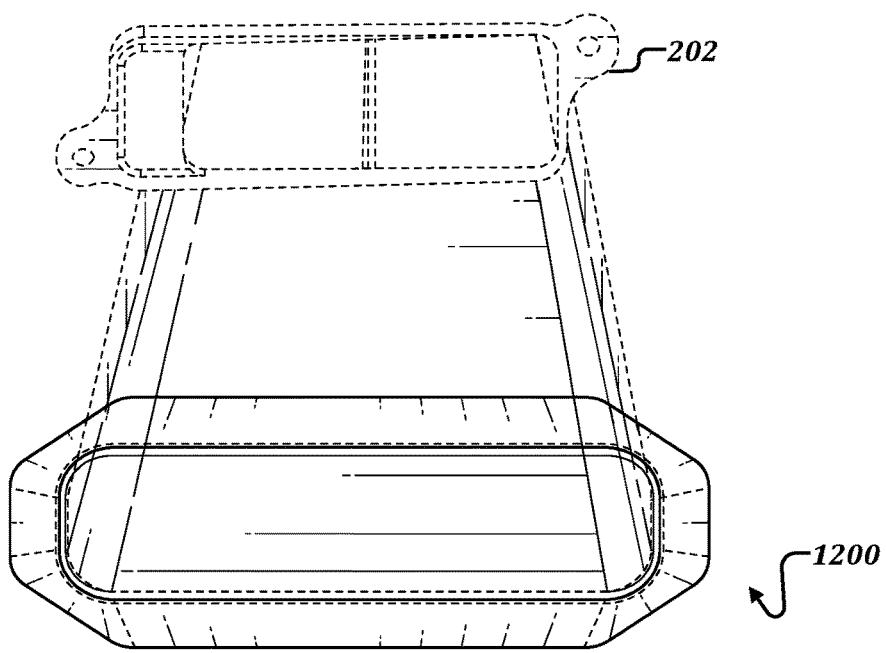
FIG. 18F illustrates a back view of an interchangeable intake manifold assembly.
Figure 18G:
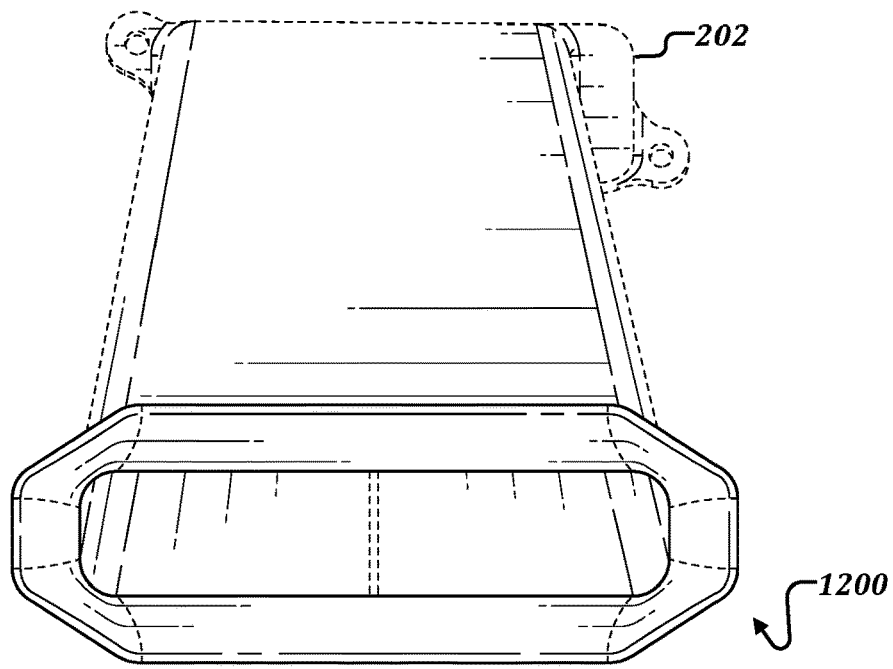
FIG. 18G illustrates a front view of an interchangeable intake manifold assembly.
Figure 18H:
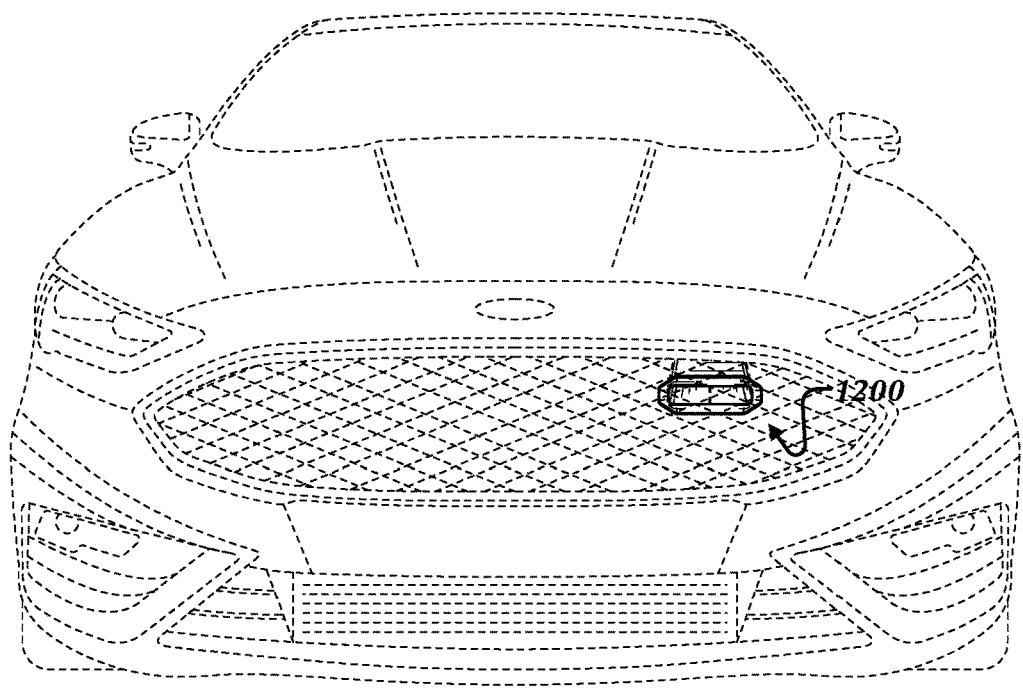
FIG. 18H illustrates a front view of front view of an automobile with an interchangeable intake manifold assembly.

As illustrated in FIGS. 15-17, additional shapes and configurations of intake manifold assemblies are possible.

For example, as illustrated in FIG. 15, common base member 1502 is shared across interchangeable intake manifold assemblies 1500. As such, bell housings or ram air intakes 1504 and 1604 may be readily interchanged across the interchangeable intake manifold assemblies illustrated in FIG. 14, FIG. 15, and FIG. 16.

As shown in FIG. 17, additional forms of interchangeable intake manifold assemblies are available for different models of automobile. Interchangeable intake manifold assembly 1700 is configured for use in automobile with dual intakes and restricted space for installation.

For example, the interchangeable intake manifold assembly 1700 comprises a base member 1702, support structures 1710 and 1711, exterior housing 1708, which further defines an interior channel 1706 configured to receive ram air intake external to the automobile. Furthermore, interchangeable bell housing 1704 may be exchanged with any other shape bell housing to alter the appearance, aesthetics, and aggressive profile as desired by a consumer.

These and other features and functionality are included within the scope of exemplary embodiments of the present disclosure.

C. Aspects

The present invention may include a plurality of aspects disclosed herein. For example, the following aspects may be included in one or more differing implementations of the present invention.

D. Claims

Aspect 1:

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An interchangeable intake assembly, comprising:
a base member being defined by an aperture configured to receive and engage an automobile intake airbox, the base member being further defined by a perimeter surrounding the aperture and having at least one protrusion disposed on an outer portion of the perimeter, each of the at least one protrusion having at least one fastener or aperture configured to receive a fastener dimensioned to avoid disturbing the automobile intake airbox;
a gooseneck member fixedly attached to the base member, the gooseneck member having a first end opening and a second end opening, the gooseneck member having an interior cavity configured to direct air into the automobile intake airbox from the second end opening to the first end opening through the interior cavity;
a plurality of interchangeable candidate bell housings, each candidate bell housing configured to be interchangeably and removably secured to the second end opening of the gooseneck member, each interchangeable bell housing comprising:
a frustoconical shaped cross section on at least one plane, and
one or more grooves; and
wherein the gooseneck member comprises one or more flanges disposed on an outer portion of the gooseneck member, each of the one or more flanges dimensioned to removably secure to one of the one or more grooves on a selected interchangeable bell housing, of the plurality of interchangeable candidate bell housings, by direct adjoinment on at least three sides.

2. The interchangeable intake assembly of claim 1, wherein the selected interchangeable bell housing is configured to be disengaged from the gooseneck member via removing the one or more flanges from the one or more grooves.

3. The interchangeable intake assembly of claim 1, wherein the selected interchangeable bell housing is removably secured to the second end opening of the gooseneck member via at least one fastener securing through the selected interchangeable bell housing and bottoming out in the gooseneck member further comprising at least one support protrusion disposed on an outer portion of the gooseneck member.

4. The interchangeable intake assembly of claim 1, wherein the base member is further defined by having a generally rectangular shape with rounded edges encompassing the perimeter.

5. The interchangeable intake assembly of claim 1, wherein the selected interchangeable bell housing is removably secured to the second end opening of the gooseneck member via directly adjoining four sides of an inner portion of the selected interchangeable bell housing threaded male portion securing to four sides of an exterior housing of the gooseneck member via a threaded female portion.

6. The interchangeable intake assembly of claim 1, wherein the selected interchangeable bell housing is removably secured, via clamshell fit, to the second end opening of the gooseneck member.

7. The interchangeable intake assembly of claim 1, wherein the selected interchangeable bell housing is removably secured to the second end opening of the gooseneck member via hook and loop.

8. The interchangeable intake assembly of claim 1, wherein the selected interchangeable bell housing is removably secured to the second end opening of the gooseneck member via friction fit.

9. The interchangeable intake assembly of claim 1, wherein the selected interchangeable bell housing is removably secured to the second end opening of the gooseneck member via a plurality of magnets.

10. The interchangeable intake assembly of claim 1, wherein the base member, the gooseneck member, and the plurality of candidate interchangeable bell housings are formed of a rigid material removably secured to the second end opening of the gooseneck member via an adhesive.

11. An interchangeable intake assembly, comprising:
a gooseneck member fixedly attached to an automotive intake airbox within an engine bay of an automobile, the gooseneck member having a first end opening and a second end opening, the gooseneck member having an interior cavity configured to direct air into an automobile intake airbox from the second end opening to the first end opening through the interior cavity;
a plurality of candidate interchangeable bell housings, each interchangeable bell housing being configured to be removably secured to the second end opening of the gooseneck member via at least one fastener securing through the interchangeable bell housing and bottoming out in the gooseneck member, each candidate interchangeable bell housing having a frustoconical shaped cross section on at least one plane and one or more grooves; and
wherein the gooseneck member comprises one or more flanges disposed on an outer portion of the gooseneck member, each of the one or more flanges being dimensioned to removably secure to one of the one or more grooves on a selected interchangeable bell housing, of the plurality of interchangeable candidate bell housings, by direct adjoinment on at least three sides.

12. The interchangeable intake assembly of claim 11, wherein the gooseneck member is dimensioned to support the selected interchangeable bell housing to be visible external to an automobile.

13. The interchangeable intake assembly of claim 12, wherein visible external to the automobile comprises visibility behind a forward intake grille of the automobile.

14. The interchangeable intake assembly of claim 13, wherein the plurality of candidate interchangeable bell housings, base member, and the gooseneck member are formed of metal, plastic, fused metal, 3-D printed material, or a rigid material.

15. The interchangeable intake assembly of claim 11, wherein the plurality of candidate interchangeable bell housings is formed of metal, plastic, injection-molded plastic, 3-D printed plastic, or a rigid material, and wherein each of the plurality of candidate interchangeable bell housings further comprises one or more protrusions at the first end opening secured to the automobile intake airbox via one or more fasteners.

16. An interchangeable intake assembly, comprising: a base member being defined by an aperture configured to receive and engage an automobile intake airbox, the base member being further defined by a perimeter surrounding the aperture and having one or more fasteners or apertures configured to receive the fasteners dimensioned to avoid disturbing the automobile intake airbox, the base member being formed of a rigid material; a gooseneck member fixedly attached to the base member, the gooseneck member having a first end opening and a second end opening, the first end opening being in fluid communication with the aperture, the gooseneck member having an interior cavity configured to direct air into the automobile intake airbox from the second end opening to the first end opening through the interior cavity; a plurality of candidate interchangeable bell housings, each of the candidate interchangeable bell housings being configured to be removably secured to the second end opening of the gooseneck member and having a frustoconical shaped cross section on at least one plane and one or more grooves and configured to receive air through a forward automotive intake grille arranged in front of the interchangeable bell housing when a selected interchangeable bell housing, of the plurality of candidate interchangeable bell housings, is installed on the gooseneck member, such that the selected interchangeable bell housing is visible through the forward automotive intake grille; and one or more flanges disposed on an outer portion of the gooseneck member, each of the one or more flanges dimensioned to interchangeably and removably secure to one of the one or more grooves of the selected interchangeable bell housing by direct adjoinment on at least three sides.

17. The interchangeable intake assembly of claim 16, wherein the base member is further defined by having a generally rectangular shape with rounded edges encompassing the perimeter.

18. The interchangeable intake assembly of claim 17, wherein the generally rectangular shape is a rhomboid or parallelogram dimensioned to engage existing fasteners or apertures configured to receive fasteners existing in an automobile.

19. The interchangeable intake assembly of claim 18, wherein at least one of the plurality of candidate interchangeable bell housings has a rectangular diamond bell shape to aid in receiving air through the forward automotive intake grill.

20. The interchangeable intake assembly of claim 19, wherein the plurality of candidate interchangeable bell housings, the base member, and the gooseneck member are each formed of metal, plastic, injection-molded plastic, 3-D printed plastic, or a rigid material.

* * * * *